MULTICUSTOMER PRIVATE BRANCH EXCHANGE

Filed Sept. 5, 1961 10 Sheets-Sheet 1

INVENTOR
V. J. MATTHEWS
BY Howard R Popper
ATTORNEY

April 27, 1965 V. J. MATTHEWS 3,180,942

MULTICUSTOMER PRIVATE BRANCH EXCHANGE

Filed Sept. 5, 1961 10 Sheets-Sheet 2

INVENTOR
V. J. MATTHEWS
BY Howard R Popper
ATTORNEY

April 27, 1965 V. J. MATTHEWS 3,180,942

MULTICUSTOMER PRIVATE BRANCH EXCHANGE

Filed Sept. 5, 1961 10 Sheets-Sheet 3

INVENTOR
V. J. MATTHEWS
BY Howard R Popper
ATTORNEY

INVENTOR
V. J. MATTHEWS
BY Howard R Popper
ATTORNEY

INVENTOR
V. J. MATTHEWS
BY Howard R Popper
ATTORNEY

April 27, 1965 V. J. MATTHEWS 3,180,942

MULTICUSTOMER PRIVATE BRANCH EXCHANGE

Filed Sept. 5, 1961 10 Sheets-Sheet 6

INVENTOR
V. J. MATTHEWS
BY Howard R Popper
ATTORNEY

April 27, 1965 V. J. MATTHEWS 3,180,942

MULTICUSTOMER PRIVATE BRANCH EXCHANGE

Filed Sept. 5, 1961 10 Sheets-Sheet 7

INVENTOR
V. J. MATTHEWS
BY Howard R Popper
ATTORNEY

MULTICUSTOMER PRIVATE BRANCH EXCHANGE

Filed Sept. 5, 1961 10 Sheets-Sheet 8

INVENTOR
V. J. MATTHEWS
BY Howard R Popper
ATTORNEY

INVENTOR
V. J. MATTHEWS
BY Howard R Popper
ATTORNEY

INVENTOR
V. J. MATTHEWS
BY Howard R Popper
ATTORNEY

United States Patent Office 3,180,942
Patented Apr. 27, 1965

3,180,942
MULTICUSTOMER PRIVATE BRANCH EXCHANGE

Vincent J. Matthews, Old Bridge, N.J., assignor to Bell Telephone Laboratories, Incorporated, New York, N.Y., a corporation of New York
Filed Sept. 5, 1961, Ser. No. 135,914
18 Claims. (Cl. 179—27)

This invention relates to telephone switching systems and more particularly to such systems for providing private branch exchange service to each of a number of distinctive switching branches.

In the copending application of O. H. Williford Serial No. 135,913 filed of even date herewith, the concept of a multicustomer private branch exchange is disclosed. A multicustomer private branch exchange as therein discussed relates to a switching system which provides service of a private branch exchange nature to a number of telephone switching branches which branches may be assigned on a flexible basis to different telephone customers. In accordance with the principles therein expounded, the telephone switching equipments for all the switching branches and different telephone customers are advantageously centrally located whereby all the telephone customer-tenants in a large office building or other high PBX density locality may be served on a group basis without resorting to the use of individually customized installations of complete PBX system equipment which equipment had therefore been required to be located in premium floor space on the premises of each of the several customers.

In the multicustomer arrangement each telephone customer requiring PBX service engages a suitable number of telephone attendants to monitor at cordless set positions a plurality of lamps indicating the condition of attendant loop circuits which may be switched-in to the switching branches assigned to the customer. By means of the switched-in loops the presence of attendant-seeking calls is made known to the attendants; and through the switched-in loops and the link common to the switching branches of the several telephone customers the attendants are given control of their associated portion of the centralized switching equipment properly to route the calls.

Inasmuch as the equipment associated with the switching branches is centrally located, it is desirable that their assignment to different telephone customers may be made on a flexible basis and thereby to accommodate the different switching needs of the successive customers who may occupy the premises in the switching locality. The distribution of attendant-seeking service requests from incoming and attendant trunks to appropriate attendant loops may be advantageously accomplished by means of common control links. However, the links themselves, being common to all the trunks and extension loops served by the system, should be as independent as possible of the vicissitudes of customer assignment and yet be capable of effecting the required connections for all the different telephone customers' equipment within substantially the same interval of time regardless of the number of switching branches assigned to any of the customers and regardless of the position in the link of the particular branch to which a particular customer may have been assigned. In other words efficient centralization is achieved where the means for effecting customer assignment involves as few changes in permanent or universal wiring as possible.

Another arch criteria for an efficient centralized switching system is that maximum utilization be made wherever possible of switch train selection capacity. Where a given level of switch train paths is restricted from selection in order that an attendant may be brought into the switching connection a reduction in selection capacity is imposed because the switch paths or tributaries normally available on that level are rendered unavailable for their normal communication functions. It is additionally desirable that while the switch train is under the control of an attendant loop distinctive indications of the status of this switching train continually be provided without unduly complicating the train or link circuit.

Accordingly, it is an object of the present invention to provide efficient common control equipment in multibranch telephone exchange switching systems.

It is another object of the present invention to conserve the capacity of private branch exchange switching channels.

It is another object of the present invention to provide for flexible call distribution among a plurality of different telephone customers being furnished PBX service from centralized switching apparatus.

It is still another object of the present invention to provide the efficient control of PBX customers' switching branch by means of simple and compact cordless attendant looped apparatus.

The foregoing and other objects are achieved in accordance with the principles of the present invention, according to one illustrative embodiment thereof, by a switching train control and call distribution circuit which responds to a restricted service condition designated incident to the operation of any of a plurality of centrally distributed switching branches, the call distribution circuit having a cross connection gate circuit for the flexible assignment of switching branches and attendant loops to the telephone customers served by the switching system; and by a plurality of attendant loops selectable by a common control link having access to the centrally distributed switching branches.

The flexible assignment of switching branch control and attendant loop apparatus among a plurality of telephone customers is facilitated by the provision of a call distribution arrangement wherein a first, or preferred, graded multiple appearance of a trunk in the attendant-seeking condition is marked on one of a plurality of trunk finders in a link common to the trunks of all the customers. The marking of a large number of such trunks is further facilitated by arranging the trunks in graded multiple groups on the link irrespective of the customer assignment and by providing for flexible customer assignment through a plurality of cross-connections in a trunk gate controlling the seizure of the link by any customer's trunk groups in accordance with the availability of that customer's attendants' loops. The marking of the graded multiple appearances of the position loops appropriate to each trunk group is controlled by a plurality of transfer contacts which are arranged in reentrant chains to embrace a number of link marking terminals commensurate with the number of attendants' positions desired to be assigned for use with the particular trunk group. The trunk and position finders of the link are started in pairs to find the marked appearance of the attendant-seeking trunk and of an idle loop of the appropriate attendant's position.

Access to an attendant loop may be obtained on an initial basis either via an incoming trunk which normally operates an associated inward switching branch directly to connect the trunk to an extension or via any of a plurality of attendant trunks reached from an extension station by dialing a suitable directing digit. In the first case the attendant-seeking trunk applies a restricted service condition to the inward switching train allowing the trunk to signal the link under the control of the trunk gate. In the second case the attendant trunk signals the link without applying the restricted service condition. The link connects the appropriate attendant loop in the switching branch and removes the restricted service condition to enable the connected attendant to control the switching branch to establish connections over any of its outputs including those priorly restricted from direct access by the incoming trunk. The utility of each switching branch is accordingly enhanced by enabling the incoming trunks to serve both direct inward dialed and attendant-seeking calls, by enabling the same switching branch to perform the dual function of (*a*) establishing connections both to extensions accessible over the incoming trunk as well as to stations accessible only to the customer's attendants, and, (*b*) of establishing these connections while seized by the original call without resort to any other switching branch.

On recall of the attendant by an extension user restricted service designations are removed preparatory to the attendants assuming control of the switching branch.

A concomitant virtue of the centralization of telephone switching equipment made possible by the present invention in one of its aspects lies in the ease with which circuit standardization may be effected regardless of the identity of the telephone customer by which the particular circuit is taken for use. Thus, it is convenient to employ standard ten level finders for both the trunk finders and position finder pairs in a link for by-passing the several switching branches and to divide the finder pairs into two groups; a first, or "A" group, having five subgroups of trunks and loops gradiently multiplied over its first five levels and five "other," or "B" group, subgroups of trunks and loops gradiently multiplied over its last five levels. A second or "B" group of finders has the aforementioned five subgroups of "other" trunks gradiently multiplied over its first five levels and the five subgroups of trunks of the "A" finders gradiently multiplied over its last five levels.

A trunk subgroup usage (PF) logic circuit provides that the "A" group of finder pairs shall normally be taken for use only by the trunk subgroups multiplied over its first five levels, and that the "other" group finder pairs shall normally be taken for use only by the trunk subgroups multiplied over its first five levels. However, the (PF) logic circuit is adapted to provide that when all the so-called "A" finder pairs are busy and no "other" or B finder pairs are busy the "B" group finder pairs may also be taken for use or pre-empted on attendant-seeking calls arising in the trunks having upper level appearances, and conversely for "A" group finder pairs when the "B" group finders are all busy.

A feature of the present invention is a call distribution arrangement for providing PBX service flexibly over a number of the independently operating switching branches.

Another feature of the present invention is a multicustomer PBX having selectively pre-emptable common control links.

A feature of the present invention is customer assignment gating means for controlling the selective by-passing of customers' switching branches. In accordance with this feature, trunk subgroups of customers sharing a division of the switching branch by-pass link are accorded a different operating preference each time the customer assignment gating means has completed controlling the by-passing of a different one of the customers switching branches.

Still another feature of the present invention is a multicustomer PBX common link control circuit permitting simultaneous by-passing of switching branches individual to different telephone customers.

A further feature of the present invention is a switching branch by-passing link having circuits normally by-passing predetermined ones of said branches selectively controllable to by-pass the remaining ones of said switching branches.

Yet another feature of the present invention is switching branch by-pass means permitting recontrol of the by-passed branch even to initially prescribed tributaries thereof.

The foregoing and other objects and features may become more apparent by referring now to the following detailed description and drawing, in which.

Figure 5:
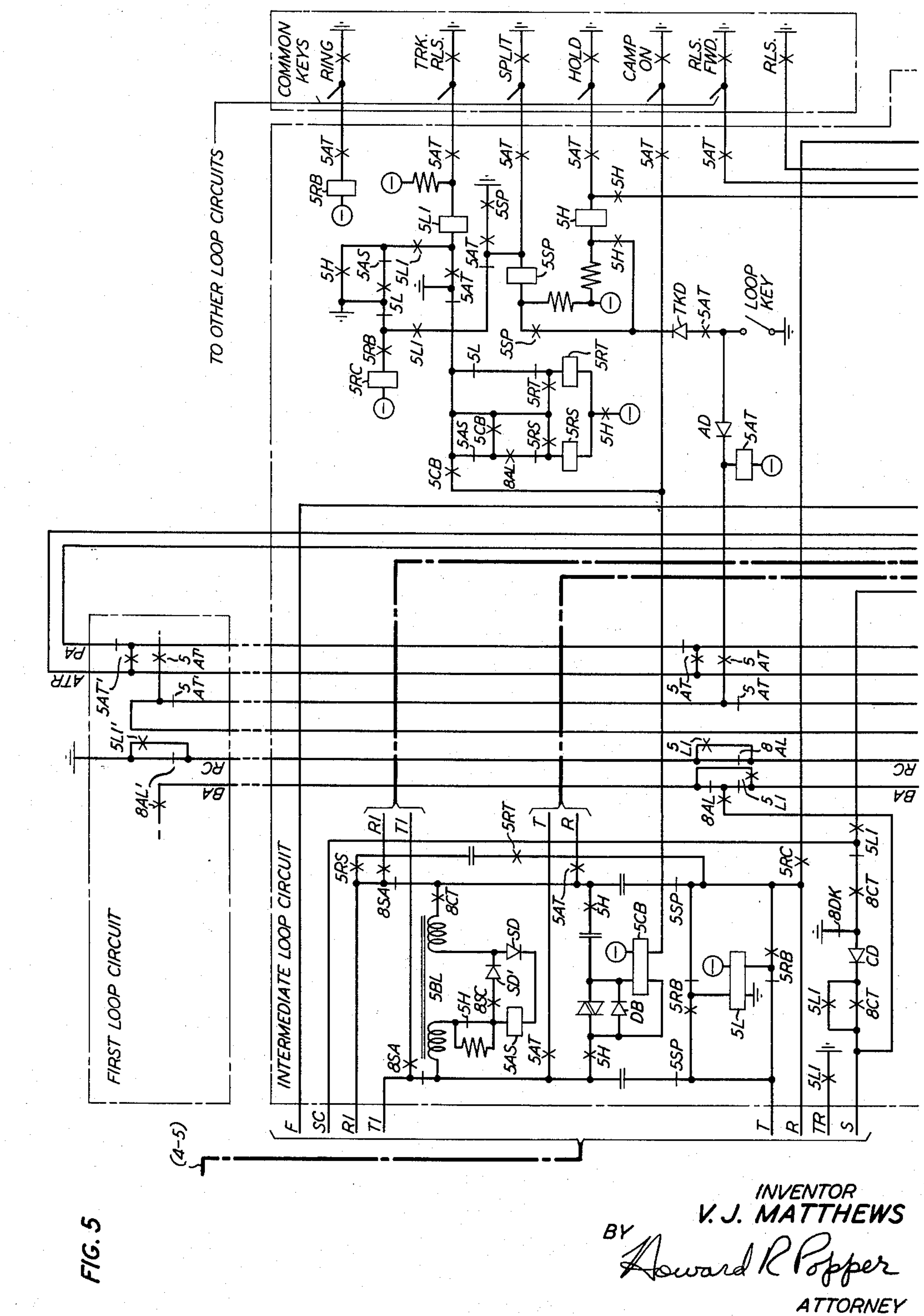
Figure 6:
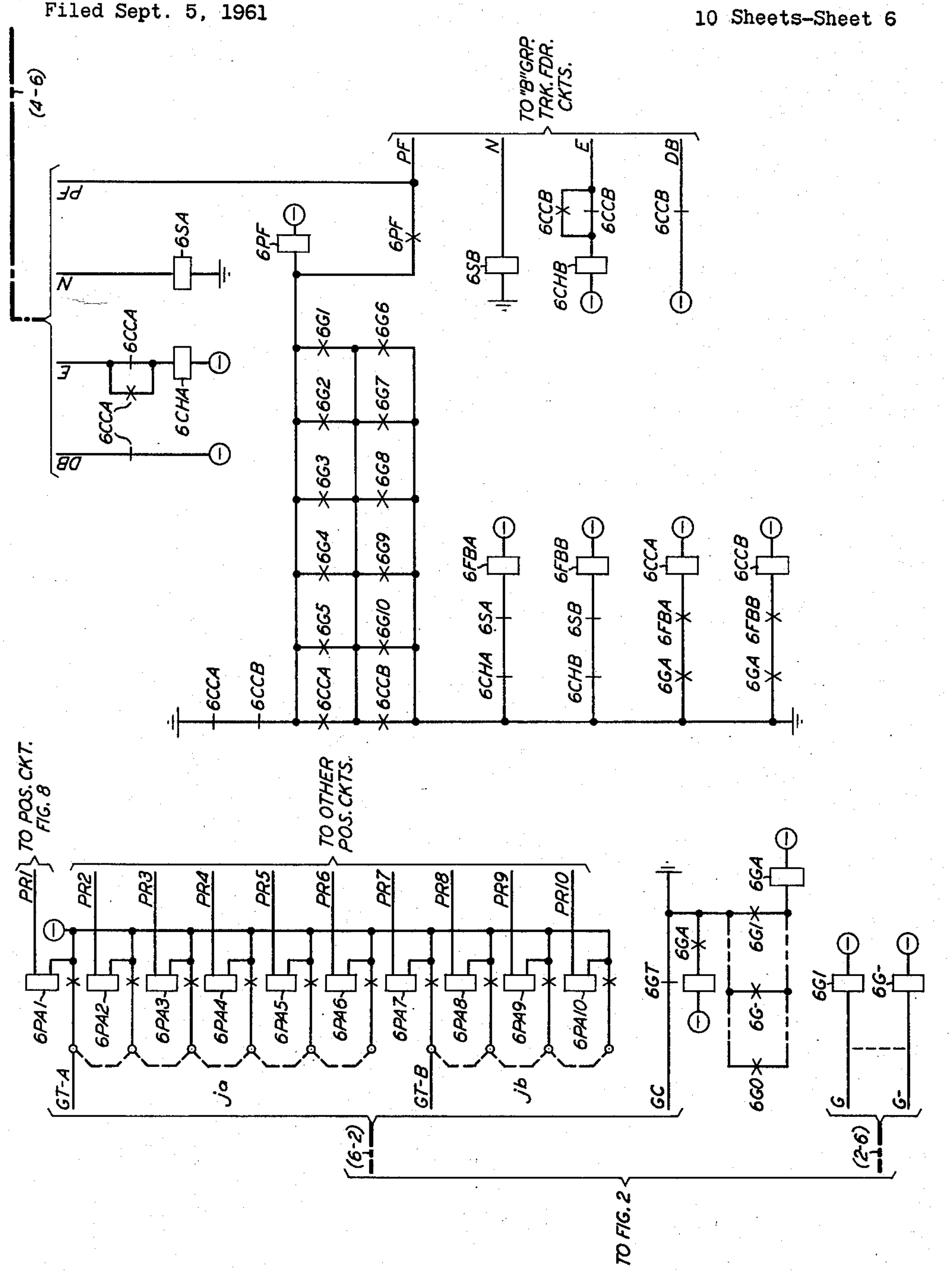
Figure 7:
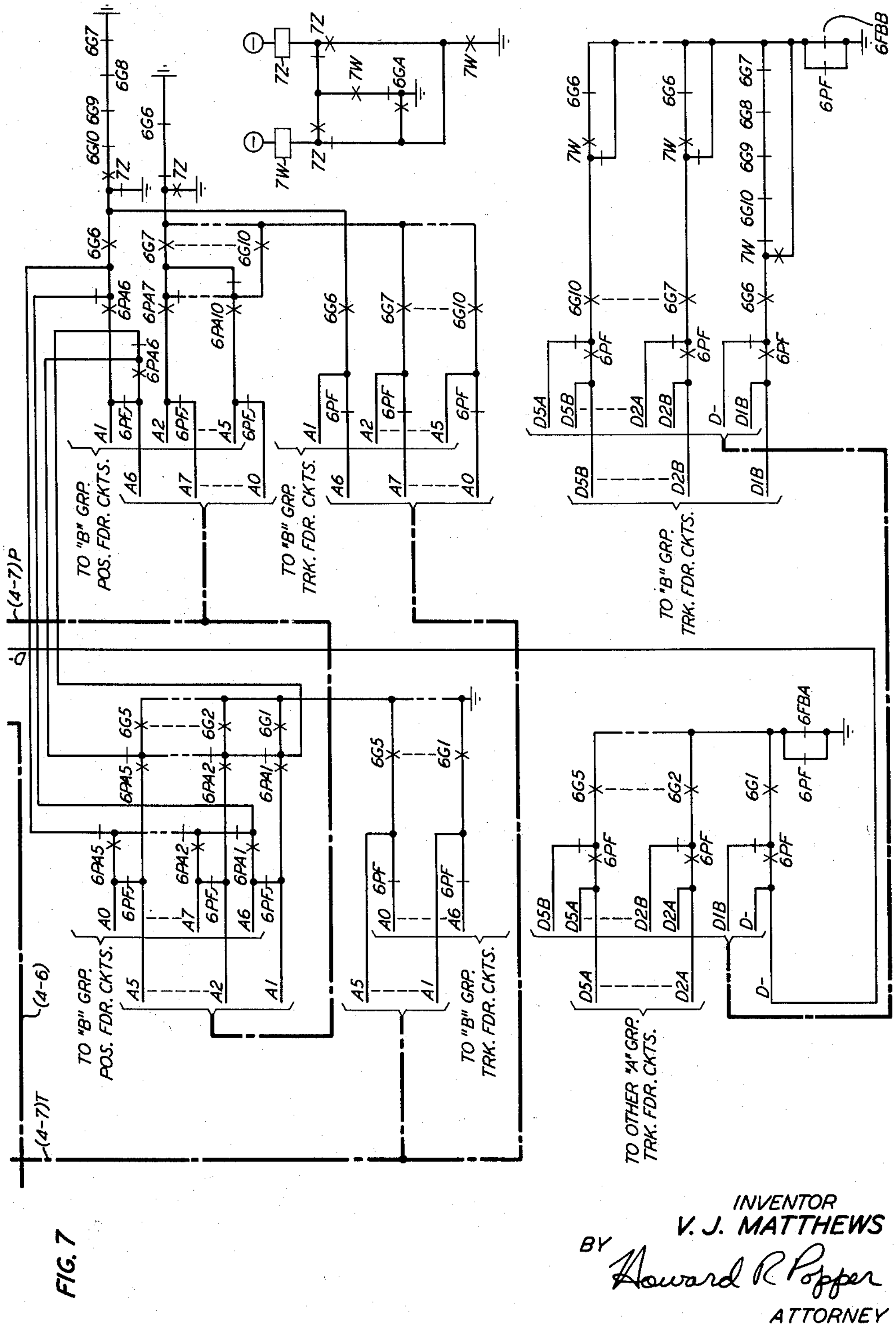
Figure 8:
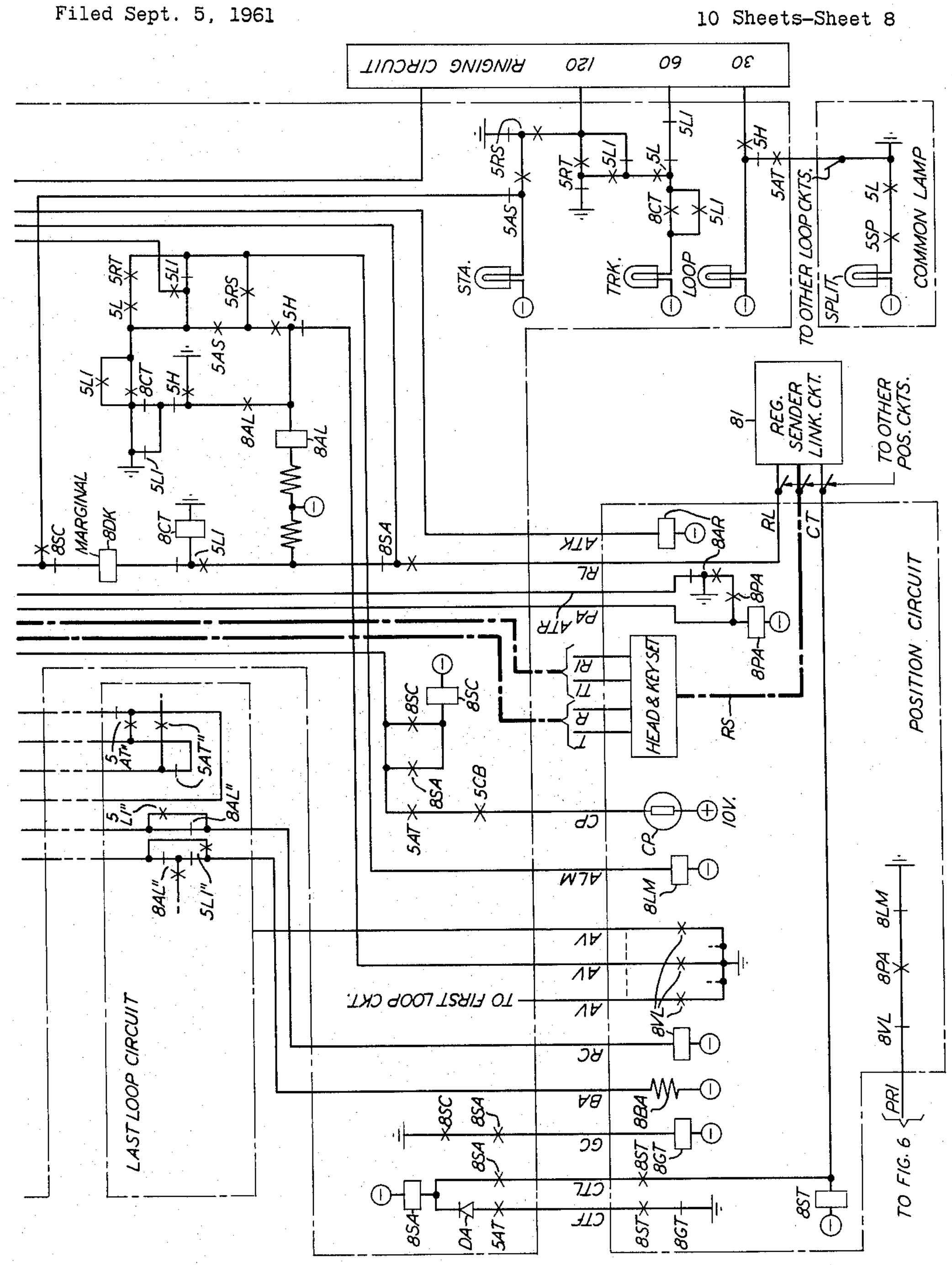
Figure 9:
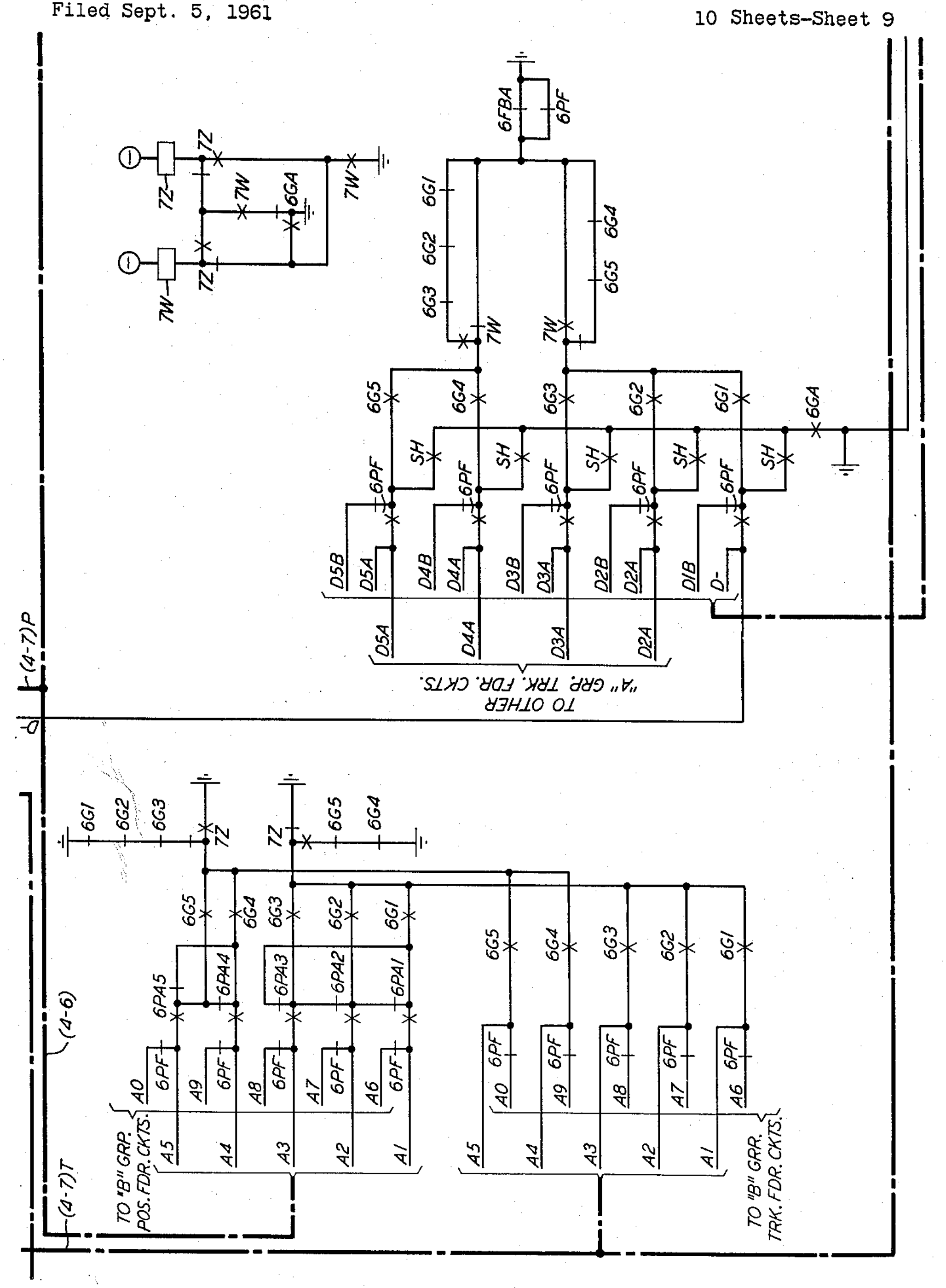
Figure 10:
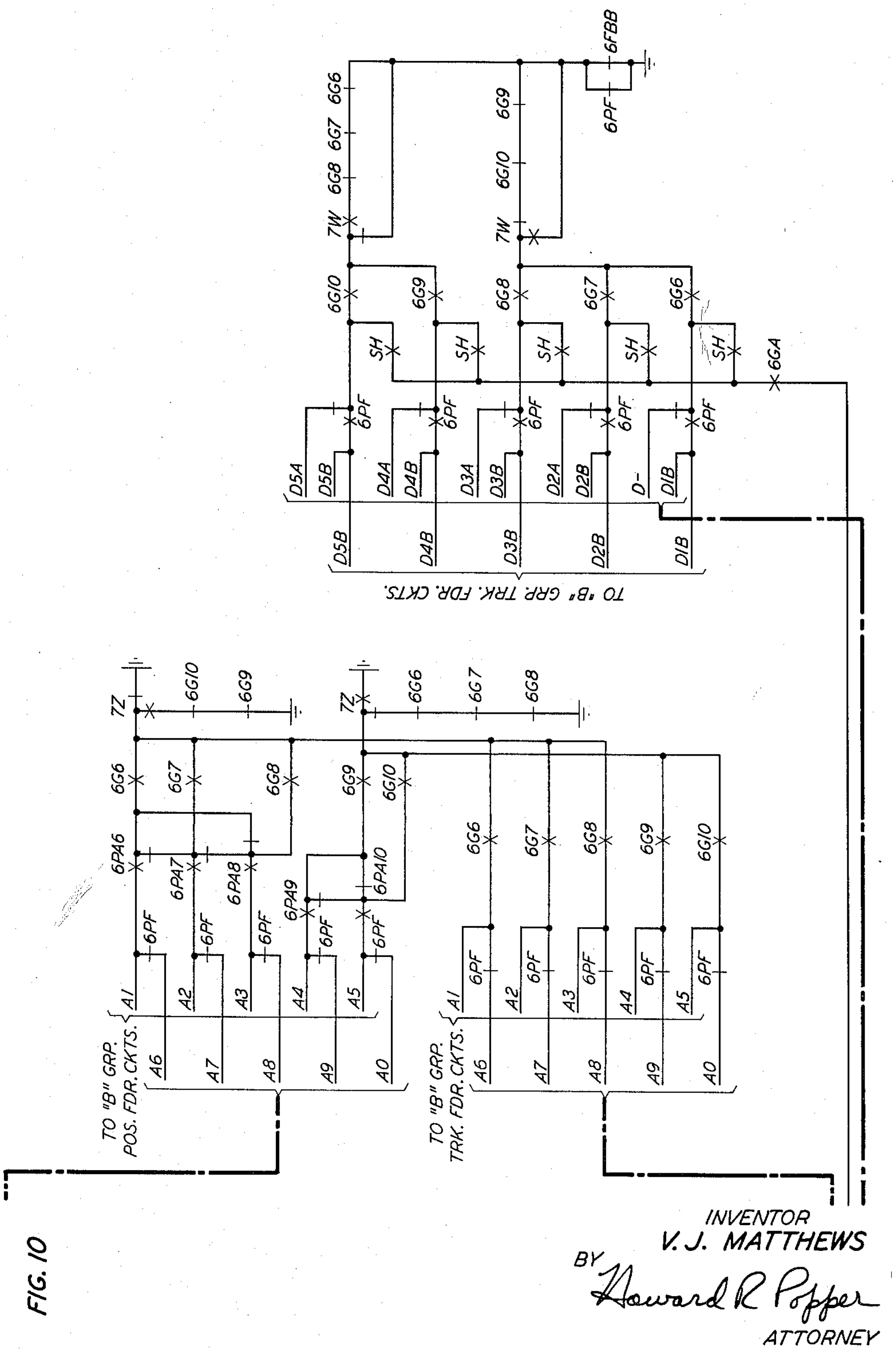

FIGS. 5 and 8 together show the loop circuits and an attendant position circuit;

FIGS. 6 and 7 together show the marking, starting and control apparatus of the call distribution circuit;

FIGS. 9 and 10 taken together show an alternative arrangement of the apparatus of FIG. 7 of the call distribution circuit.

Figures 2, 11, 12:
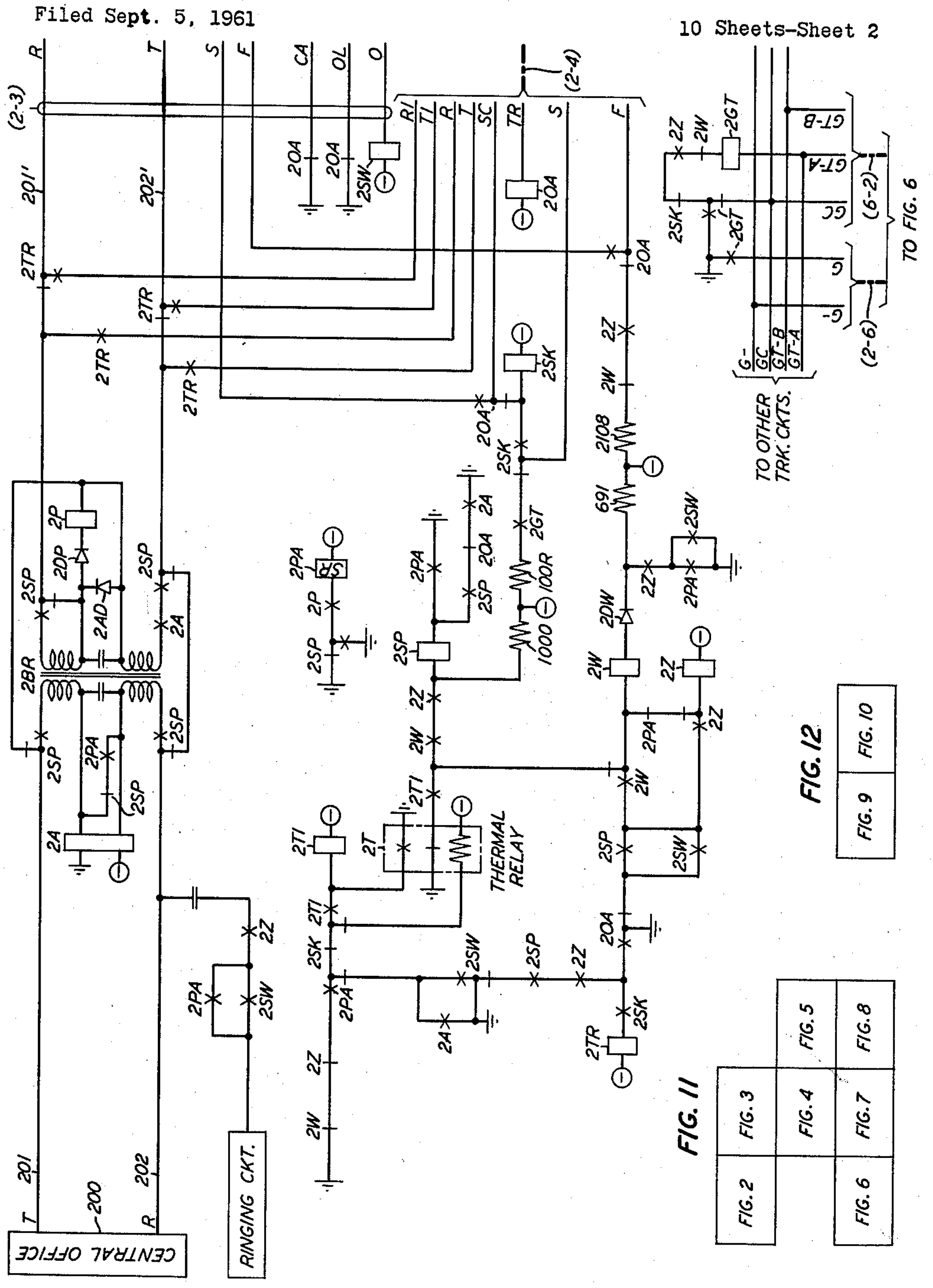
FIG. 2 shows an incoming trunk circuit.

FIGS. 11 and 12, respectively, show the manner in which FIGS. 2 through 8 and 9 and 10 shall be oriented.

GENERAL DESCRIPTION

Figure 1:
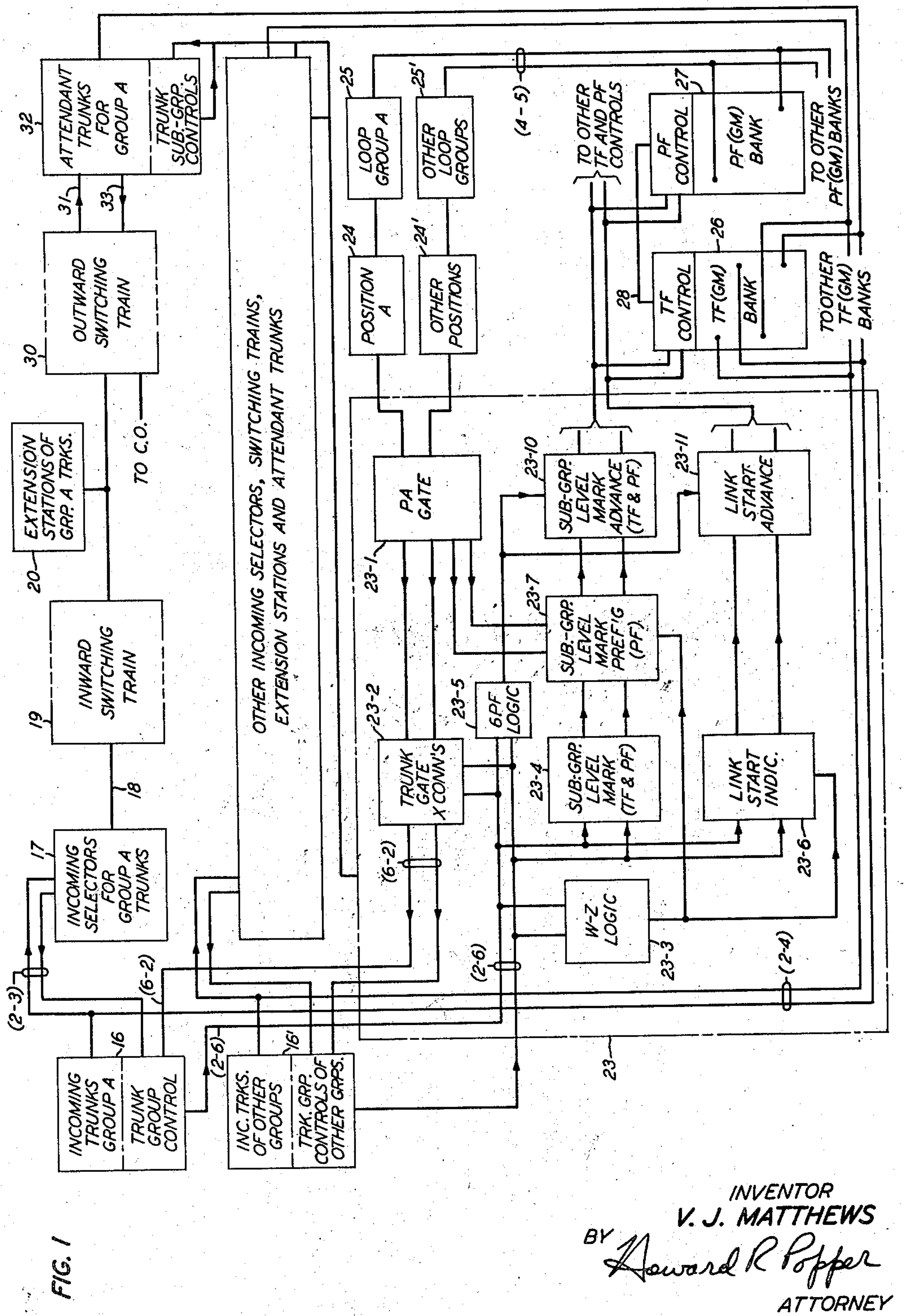
FIG. 1 shows in block diagram form one specific illustrative embodiment of a multicustomer private branch exchange system in accordance with the present invention.

The system concepts embodied in the present invention are schematically outlined in FIG. 1. Each telephone customer served by the system is assigned several incoming trunks in either or both the incoming A group trunks 16 and the Other group trunks 16' depending upon the volume of traffic anticipated for that customer. Each incoming trunk (not individually shown), of trunks 16 for example, is to be understood as being connected via respective leads in cable (2–3) to a corresponding selector of the A group incoming selectors 17. For the purpose of simplifying the drawing and the ensuing general discussion it may here be assumed that all the A group trunks 16, selectors 17 and extension stations 20 are assigned to be used by the same telephone customer and that the corresponding trunks, selectors and extension stations of the Other group trunks 16' belong to at least one different telephone customer.

Normally, an incoming call arriving over one of the trunks, of trunk group 16 for example, is automatically routed by selectors 17 and inward switching train 19 to the one of the extension stations 20 whose number was transmitted over the calling trunk. Inward switching train 19 includes a connector stage (not shown) for completing incoming calls to the extension stations 20, and if the number of stations 20 warrants, a stage of selectors in addition to incoming selectors 17.

When, however, the incoming trunk transmits to the associated one of the incoming selectors 17 the number of a PBX attendant instead of that of an extension station, the operated selector, via appropriate leads of cable (2–3), activates the trunk subgroup control associated with the subgroup of trunks in which the calling trunk is located. The activated subgroup control, if enabled via cable (6–2) by the trunk gate cross connection portion 23-2 of the call distribution circuit 23 (as instructed by the availability of attendants' positions 24–24' for the particular PBX customer whose attendant is sought), indicates its request over cable (2–6) to the marking and starting circuits 23-4, 23-6, respectively, of the call distribution circuit. The activated subgroup control also causes the calling trunk to mark its graded multiple appearance on the banks of a plurality of trunk finders switches including the illustrated finder 26 by energizing appropriate leads of cable (2–4).

Call distribution circuit 23, in response to the activation of cable (2–6) by the one of the subgroup controls associated with the calling trunk, operates trunk finder 26 and position finder 27 simultaneously to find, respectively, a graded bank multiple appearance of the terminals of cable (2–4) corresponding to the calling trunk and a graded bank multiple appearance of the terminals of cable (4–5) corresponding to the loop circuits of the attendant appropriate to the calling trunk group. When the finders 26 and 27 find and connect to the respective bank multiple appearances of the calling one of trunks 16 and of loops 25, their respective control circuits establish a continuous path via cable 28 between the found trunk and the found one of loops 25 associated with the available attendants' position 24.

In addition to the inward switching train 19, by means of which calls are completed to stations 20, an outward switching train 30 is provided so that any one of stations 20 may originate calls to any other one of stations 20, to the central office and to the attendant position 24 associated with stations 20. For this latter purpose, outward switching train 30, controlled by one of stations 20, selects an idle one of attendant trunks 32. Trunks 32 have graded multiple appearances on the banks of the trunk finders, such as the illustrated trunk finder 26, in similar fashion to the graded multiple appearances of incoming trunks 16.

The division of the trunks into the A group 16 and the Other group 16′ may be accomplished on any basis appropriate to the particular characteristics of the switching components used. Thus, if the link 26, 27, 28 including trunk finder 26 and position finder 27 comprises any of the well known types of finder switches having room for 100 (multiple conductor) lines on its terminal bank, one half the terminal bank may be assigned to fifty A group incoming and attendant trunks (16 and 32, respectively) and the other half of the terminal bank may be assigned to the fifty Other group incoming and attendant trunks (16′, etc., respectively).

Such 100 line switches normally are arranged so that access to the terminals of a particular line is obtained by selecting one of ten vertical steps and one of ten rotary positions on the terminal bank of a particular switch. Accordingly, it is convenient to assign to each vertical step ten trunk lines all belonging to the same telephone customer, and to differentiate between customers by the different levels upon which their trunk lines appear. Similarly, it is advantageous to assign all the attendants' position loops appearing on one level of any position finder 27 to an attendant's position for one telephone customer. In this manner five subgroups of trunks, each comprising ten trunks, may be allocated between the incoming and attendants trunks 16 and 32 respectively and five subgroups of trunks may be allocated among the other incoming and attendants' trunks 16′, etc.

Within call distribution circuit 23, the availability of all the attendants' positions 24, 24′ for each of the different telephone customers being furnished PBX service, is stored in PA gate 23–1 and correlated against the assignment of trunk groups to telephone customers by trunk gate cross-connections circuit 23–2, the output of which circuit energizes the leads of cable (6–2) to the trunk subgroup controls of trunk groups 16 and 16′.

When the call distribution circuit 23 is brought into operation by the energization of appropriate leads of cable (2–6), subgroup level marking circuit 23–4 and link start indicating circuit 23–6 are activated. Normally, subgroup level marking circuit 23–4 responds to the activation of the leads of cable (2–6), corresponding to the subgroup of trunks over which an attendant-seeking call arises, to mark a corresponding commutator (not shown) level of the trunk finder 26 control circuit. When trunk finder 26 is subsequently started into operation its commutator wipers rise to the level of terminals marked by group level marking circuit 23–4 and subsequently hunt across the terminals of the subgroup of trunks associated with that level until the terminals of the particular trunk which started call distribution circuit 23 into operation are found.

Simultaneously with the operation of subgroup level marking circuit 23–4, the energized leads of cable (2–6) activate link start indicating circuit 23–6. With the W–Z logic circuit 23–3 normal, link start circuit 23–6 indicates to link start advance circuit 23–11 that one of the plurality of trunk finders, such as finder 26, on whose commutator (not shown) the calling subgroup of trunks appears in a preferred (e.g. lowest) position.

Subgroup level mark preferencing circuit 23–7, which is connected to modify the marking provided by circuit 23–4, is brought into a first mode of its operation by information received from PA gate 23–1 when the attendant's position normally to be connected to the calling trunk is busy, and subgroup level preferencing circuit 23–7 is brought into the second mode of its operation by information received from W–Z logic circuit 23–3. W–Z logic circuit 23–3 has its inputs from the trunk group controls of both A group trunks 16 and Other group trunks 16′ and controls circuit 23–7 to equalize the opportunity for trunks belonging to different customers, but included in the same trunk group, to obtain access to the call distribution circuit 23. W–Z logic circuit 23–3 is brought into operation, when the trunk subgroup controls are assigned to two different customers in the same over-all group, for example Other group trunks 16′, are activated at the same time. In order to maintain the distinction between the different telephone customers' attendants it is preferable not to have those trunk finders 26 and position finders 27 that are normally assigned for use with the trunk group (e.g., group 16′) hunting at the same time for trunks and attendant loop circuits of the different customers. Accordingly, W–Z logic circuit 23–3 accords preference to one of the two customers enabling call distribution circuit 23 to control the links 26, 27 rapidly to dispose of the calls for that customer. When the subgroup controls for that customer's trunk de-energize their associated leads of cable (2–6) W–Z logic circuit 23–3 shifts the preference so that the other customer in the group may have his calls dispatched. Link start indicating circuit 23–6 is activated by the output of W–Z logic circuit 23–3 to indicate to circuit 23–11 the preferred trunk finder to be started in correspondence with the subgroup marking provided by circuit 23–7.

If (for example, during the interval between the initial enabling of cable (6–2), by the combined operations of PA gate 23–1 and trunk gate cross-connection circuit 23–2, and the activation of the leads of cable (2–6) by a calling one of the trunk subgroup controls) the normally preferred position for the telephone customer associated with the calling subgroup of trunks has become unavailable, access to the loops of another attendant position available to serve that telephone customer's subgroup of trunks may be obtained by PA gate 23–1 operating subgroup level mark preferencing circuit 23–7 to alter its normal subgroup level marking output to indicate to preferencing advance circuit 23–10 the level of the loops of the next available position.

Preferencing advance circuit 23–10 is controlled by the output of PF logic circuit 23–5 further to alter the subgroup level marking obtained from mark preferencing circuit 23–7 under the conditions obtaining when all the links 26, 27 which have the multiple appearances of the terminals for a given customer arranged to give that customer preferential treatment are busy and when none of the links having multiple appearances of that customer's terminals in a subordinately preferred distribution are busy. For example, in an office building having a number of different telephone customers being supplied with PBX service it frequently happens that for short periods of time one telephone customer may have nearly all of his incoming trunks in use while during that same interval another telephone customer may have no incoming trunks in use. When both customers' trunks are in the same group, such as group 16′ for example, W–Z logic circuit 23–3 makes all the finders 26, 27 normally associated with that group (group 16′) available to be used by attendant-seeking calls incoming to the busy customer. If in addition thereto no calls are temporarily incoming to the customer whose trunks are included in the A group of trunks 16 PF logic circuit 23–5 detects this condition and temporarily controls subgroup level mark preferencing advance circuit 23–10 and link start advance circuit 23–11 to allow the busy telephone customer to use those of links 26, 27 normally preferred to be used by the A group trunks 16. For example, if all of the group A incoming trunks 16 and attendant trunks 32 have graded multiple appearances over the lower half of the banks of a first group of finders 26 and over the upper half of these banks the incoming and attendant trunks of the Other group trunks 16′, etc. have graded multiple appearances, operation of PF logic circuit 23–5 will control advance circuits 23–10 and 23–11 to allow these finders to be brought into operation to serve, via the upper half of their terminal banks, the attendant-seeking calls incoming over the Other group trunks 16′, etc.; provided, however, that these finders are not required to be used by the customers whose lines have graded multiple appearance over the lower half of their respective terminal banks.

When a call has been connected through to one of the attendant loop circuits appearing on the graded multiple banks of one of the position finders 27, the attendant associated with the position having control of the selected loop is given an indication of the type of call requiring her assistance. The attendant answers the call and may converse with the call originator over the talking path provided by the links 26, 27, 28. The attendant may thereafter operate her position circuit equipment, for example to connect the incoming call to the appropriate one of stations 20, and, after receiving an indication that the extension has answered she may disconnect her loop and release links 26, 27, 28.

*General description of FIGS. 2 through 8*

Figure 3:
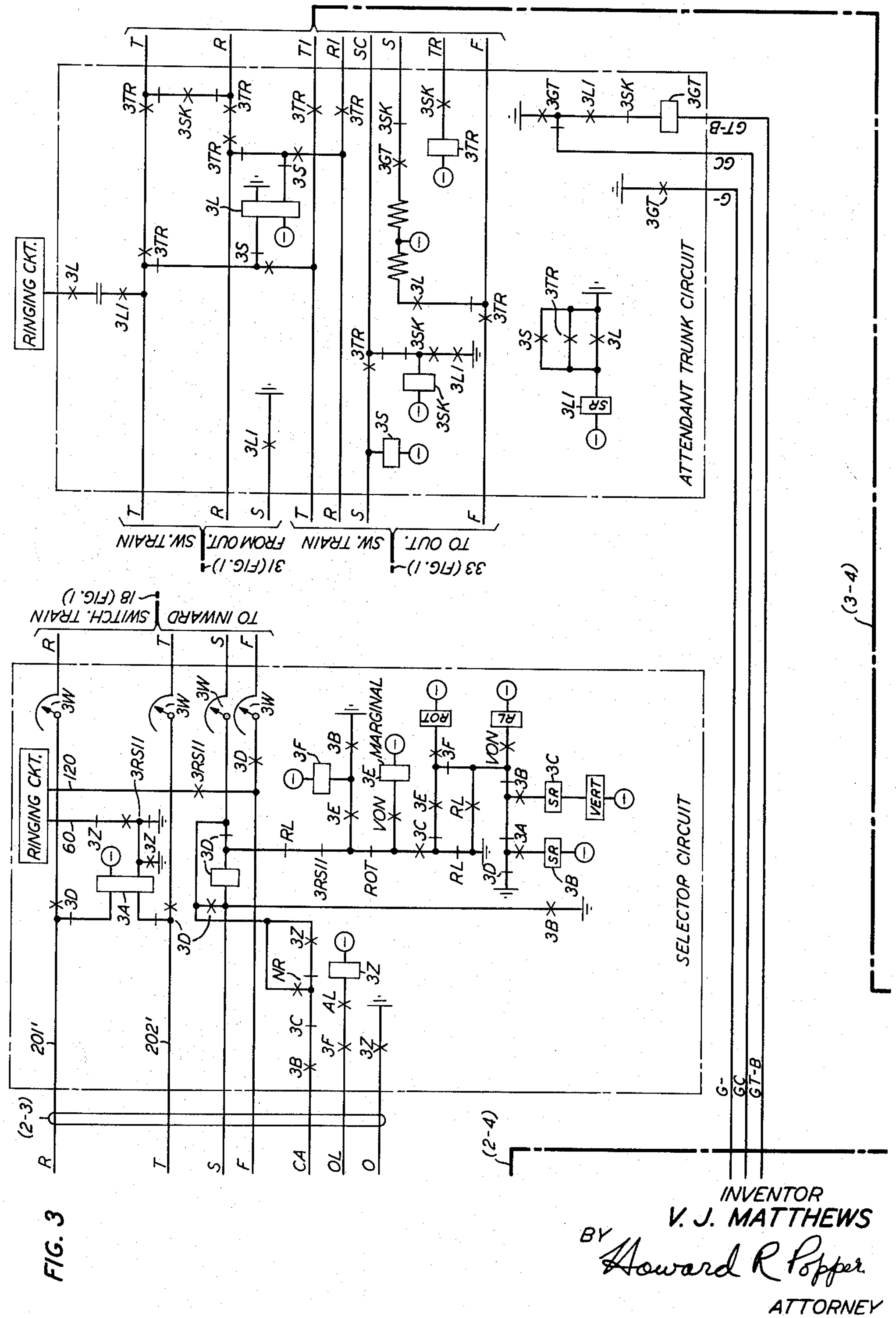
FIG. 3 shows a first selector of the inward switching train and an attendant trunk circuit associated with the outward switching train.

A call directed to the switching system of the present invention from a central office 200 of FIG. 2 is transmitted over the conductors 201–202 of the incoming trunk, by-passes repeat coil bridge 2BR and is continued over conductors 201′–202′ to the incoming selector (FIG. 3). The incoming selector associated with the incoming trunk is seized by the central office 200 calling bridge and operated in a well-known manner by the first series of pulses transmitted from the central office 200 to raise its wipers 3W to the level dictated.

In the event that the calling party has dialed the number of the desired one of the extension stations 20 (FIG. 1) the subsequent pulses transmitted by central office 200 operate the remaining stages of inward switching train 19 to complete the connection of the incoming trunk with the desired station. On the other hand, the calling party may only know the listed directory number of the attendant serving the called PBX user. Attendant directory numbers are assigned so that the first digit transmitted by central office 200 causes the normal post (not shown) carrying wipers 3W of the selector circuit to rise a predetermined level at which level the contact AL is operated. Contact AL operated completes an operating ground (prepared by the operation of mesne selector circuit relays, hereinafter to be discussed in detail) to the OL lead of cable (2–3) to inform the incoming trunk that the call is attendant-seeking. Relay 2SW of the incoming trunk operates in response to the selector ground, and in operating, initiates a series of trunk circuit operations culminating in the operation of incoming trunk relay 2Z. Relay 2Z operated prepares an operating path for trunk subgroup control relay 2GT shown in the lower right hand portion of FIG. 2. Subgroup control relay 2GT, when enabled by the call distribution circuit (FIG. 6) over the circuit prepared by the operation of relay 2Z, grounds its appropriate trunk subgroup service request "G" lead of cable (2–6) to the call distribution circuit. The grounding of a trunk subgroup "G" lead of cable (2–6) operates a corresponding one of the "6G" relay of the call distribution circuit. Contacts of the various "6G" relays operate the subgroup level marking and finder link starting circuits detailed in FIG. 7 and control the state of the 6PF logic circuit whose input is shown in FIG. 6 and those contacts are shown in FIG. 7.

Figure 4:
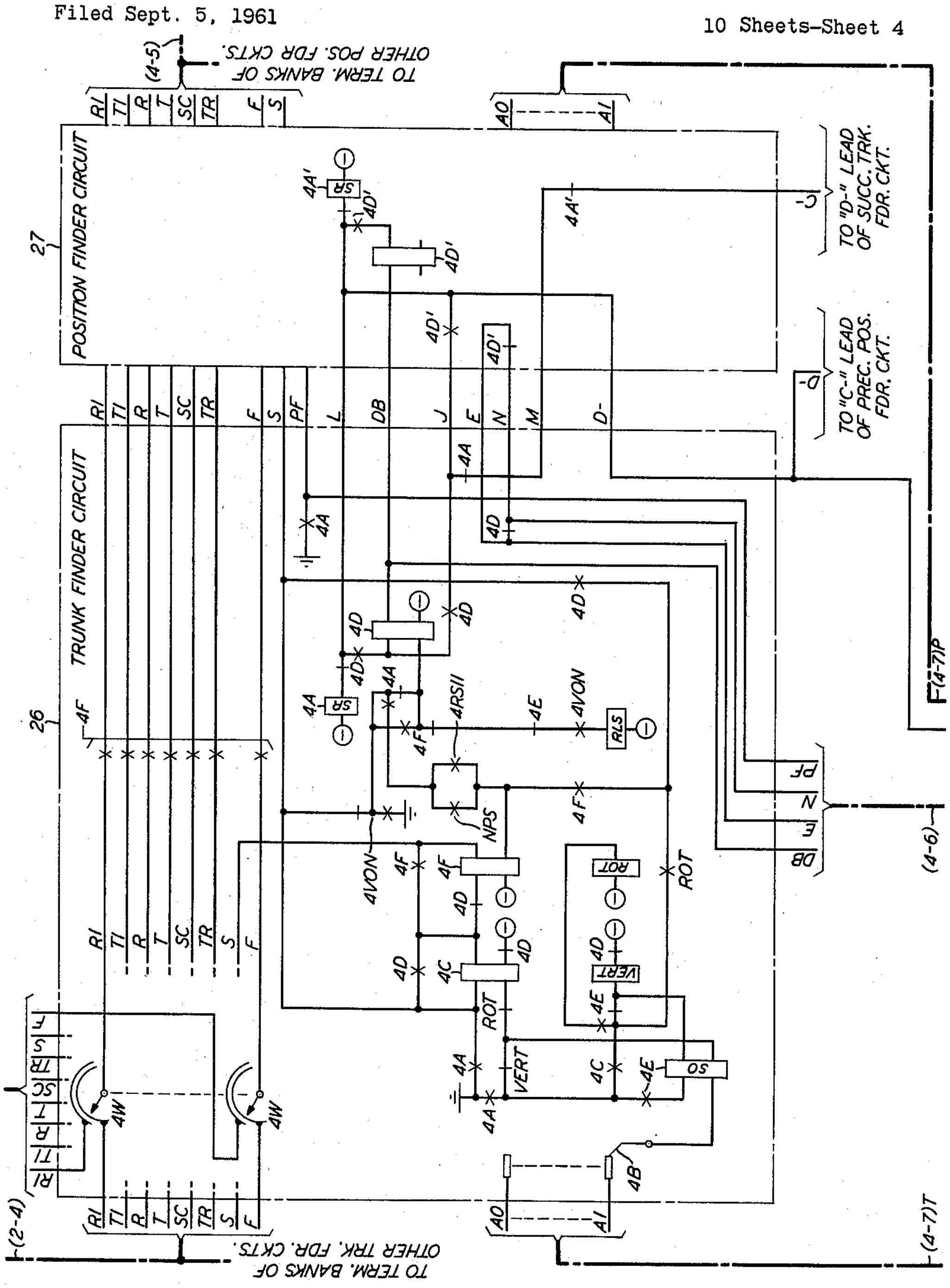
FIG. 4 shows the link circuit.

The operated one of the "6G" relays extends an operating ground over its make contact (FIG. 7) to mark one of the "A" leads multipled to the commutators of the plurality of finder link pairs 26, 27 (FIG. 1) one of which is shown in detail in FIG. 4. The operated one of the "6G" relays also extends an operating ground over its make contact to a "D" starting lead such as lead D— which is directly connected to its preferred trunk finder as illustrated in FIG. 4. The D· start lead when grounded starts both the trunk finder and position finders of FIG. 4 simultaneously to begin hunting over their terminal banks for the calling trunk and for an idle loop circuit on their respectively marked commutator levels. When the wipers of finder switches have selected the marked terminals, the 4F relay operates in each finder circuit cutting through the leads of cable (2–4) to the corresponding leads of cable (4–8).

Relay 4F operated completes a path from the incoming trunk circuit resistance battery attached to the F lead of cable (2–4) to the winding of the 8CT relay of the attendant loop circuit (FIG. 8). Operation of relay 8CT initiates a sequence of operations in the attendant loop circuit and the associated position circuit causing the attendant to be signaled and also causing a "loop found" signal to be returned to the incoming trunk (FIG. 2). The call distribution circuit (FIG. 6) is signaled that a call has been directed to the particular position and the incoming trunk circuit is signaled to remove its access request signal form the call distribution circuit.

The attendant answers the call by depressing the loop key (FIG. 5) indicated by the flashing loop lamp (FIG. 8) thereby operating relay 5AT whose contacts connect the T and R leads incoming from the link circuit to the position circuit (FIG. 8). The call distribution circuit and the incoming trunk are signaled that the call has been answered by the attendant over one of the loop circuits and the incoming trunk in response to the signal transfers leads 201–201′ from the C.O. and leads 202–202′ from the incoming first selector to the path provided over the relay 4F contacts of the trunk and position finders to the operated loop circuit. The operated loop circuit causes the incoming selector relay 3A to release restoring the incoming selector to normal and making it available to be reoperated under control of signals from the attendant's position.

With the release of the incoming selector ground is removed from the O1 lead of cable (2–3) causing relay 2SW in the incoming trunk circuit to release, resetting the incoming trunk control. The calling party informs the attendant as to the identity of the person desired and the attendant operates her telephone set equipment at the position to key the number of the corresponding extension over the T1 and R1 leads of the link and incoming trunk to the T and R leads of cable (2–3) for reoperating the incoming first selector and the remaining stages of the inward switching train. When the called station answers the connector (not shown) in the switching train returns reverse battery supervision over the T and R leads operating the station lamp (FIG. 8) of the loop circuit. By means of other T controlled circuits of the attendant loop, hereinafter to be described in detail, the attendant may, inter alia, flash the central office, hold a connection while another incoming call is processed, release the cell from the attendant loop, cause the switching train to camp on a busy extension and transfer a call originally routed to an extension by the inward switching train to any other extension.

DETAILED DESCRIPTION

*Incoming trunk circuit (FIG.2)*

When a call is initially directed by central office 200 to the trunk circuit of the multicustomer PBX switching system relays 2SP and 2TR are in the released condition and the bridge applied by the central office causes the incoming selector (FIG. 3) to be seized. The dial pulses thereafter transmitted by the central office 200 are applied between conductors 201 and 202 and continued by conductors 201' and 202' to operate the first selector in accordance with the first dialed digit. If the calling party has dialed the number of a desired extension station, the inward switching train will continue to respond to the second and succeeding digits transmitted by the central office 200 to connect the calling party with the desired extension.

On the other hand, if the calling party has dialed the directory number of the PBX attendant, the first, or incoming, selector will be operated to the attendant level by the first digit transmitted by central office 200. Advantageously the tenth or "O" level of the selector may be designated as the attendant level. The incoming selector completes a path from the ground applied thereto over back contact 20A and lead OL of cable (2–3) to operate relay 3Z which operates to ground the "O" lead of cable (2–3) causing relay 2SW to operate.

Relay 2SW operated extends an operating ground to the winding of thermal relay 2T, the path being traced from ground, front contact 2SW, back contact 2PA, back contact 2SK, back contact 2T1, the winding of thermal relay 2T and battery. Thermal relay 2T provides a delay after, inter alia, the operation of relay 2SW and before the operation of relay 2Z so that any additional digit signals which may be transmitted by the central office after the signal which operates the incoming selector to the attendant level will not be transmitted to the attendant.

The operating path for relay 2Z is completed by relay 2T as follows:

The make contact of relay 2T operates approximately one second after relay 2SW is operated and applies an operating ground to operate relay 2T1 which locks to the ground provided in the operating path for relay 2T, and relay 2T1 operated opens the operating circuit for relay 2T. After a suitable additional delay, for example 2–3 seconds, relay 2T restores to normal and operates relay 2Z over the path: ground, back contact 2T, front contact 2T1, and the back contacts of relays 2W, 2PA and 2Z to the winding of relay 2Z.

Relay 2Z operated completes a circuit for subgroup control relay 2GT which operates, locks and applies an initiating ground signal to the "G" lead of cable (2–6) of the call distribution circuit. The operating path of relay 2GT may be traced from battery applied over lead GT–A of cable (6–2) by an operated one of the "6PA" relays, winding 2GT, back contact 2W, front contact 2Z, back contact 2SK, and back contact 2GT to ground applied over lead GC of cable (6–2). Relay 2W is prevented from operating by the ground which is applied both to its winding and the winding of relay 2Z by the battery shunting circuit including front contacts 2Z and 2SW which shunt the resistance battery otherwise applied to the winding of relay 2W through diode 2DW.

Relay 2Z operated and relay 2W released extend resistance battery 2108 to the F lead of cable (2–4) over the path: battery, resistor 2108, back contact 2W, front contact 2Z and back contact 20A to lead F. Resistance battery on the F lead of cable (2–4) marks the graded multiple appearances of the incoming trunk of FIG. 2 on the trunk finder banks (FIG. 4).

The call distribution circuit brought into operation by the grounding of the "G" lead of cable (2–6), controls the finders of FIG. 4 to connect an idle position loop to a preferred multiple bank appearance of the terminals of cable (2–4) resulting in the application of a ground signal to sleeve closure lead SC of cable (2–4) by the selected position loop. Ground on the SC lead operates relay 2SK over back contact 20A and relay 2SK operated locks over its make contact to the S lead of cable (2–4). Relay 2SK operated opens the locking paths for relays 2GT and 2T1 which relays release. The release of subgroup control relay 2GT removes the access requesting ground from the "G" lead of cable (2–6) to call distribution circuit and the release of relay 2T1 restores the 2T thermal relay timing circuit to normal. The thermal relay timing circuit when restored to normal is now available to provide delays to distinguish between temporary line disturbances and switchhook signaling by the called extension station and to distinguish between temporary disturbances and a disconnect by an extension station prior to central office disconnect.

When the attendant answers the call connected to her loop by the operations initiated by the 2GT relay, ground is applied over lead TR of cable (2–4) to operate relay 20A. Relay 20A operated removes the locking ground for relay 2Z which releases to remove from central office lead 202 the audible tone provided by the ringing circuit. Relay 20A operated completes an operating ground to the winding of relay 2TR over the path prepared by relay 2SK. Relay 20A operated also removes ground from leads CA and OL of cable (2–3). Relay 2TR operates conecting the tip and ring leads 201 and 202 from the central office and the tip and ring leads 201' and 202' from the first selector to cable (2–4). The bridge maintained by the central office between conductors 201 and 202 is disconnected from leads 201' and 202' by the opening of back contacts 2TR and the first selector is enabled to release under control of the loop circuit elements connected to leads 201' and 202' by front contacts 2TR. With the incoming first selector released ground is removed from the 01 lead of cable (2–3) and relay 2SW releases.

When relay 2TR operates relay 2P of the 2BR repeat coil bridge is operated by battery applied to the T lead and ground applied to the R lead of cable (2–4) by the position loop, its operating path being traced from ground on the R lead, front contact 2TR, back contact 2SP, diode 2DP, winding 2P, lead 201, central office bridge, lead 202, back contacts 2SP, front contact 2TR to battery on lead T of cable (2–4). Relay 2P operated completes an operating ground provided over back contact 2SP to operate relay 2PA. Relay 2PA operated completes an operating path in series with back contact 2SP to operate relay 2A of the 2BR repeat coil bridge circuit. In addition, relay 2PA applies an operating ground to the winding of relay 2SP. Relay 2SP operates, transfers the operating path for relay 2A from the 2PA controlled contact to the incoming trunk leads 201 and 202 and also connects repeat coil bridge 2BR across leads 201 and 202 to the central office 200. The battery and ground potentials formerly applied to conductors 201 and 202 by the T and R leads of cable (2–4) are reversed by the battery and ground applied over the windings of relay 2A, thereby giving answer supervision to the central office. Relay 2P remains operated over the ground applied from the R lead of cable (2–4) and continued over make contact 2TR, make contact 2SP, diode 2DP, winding 2P, make contact 2A, make contact 2SP, make contact 2TR and battery applied to the T lead of cable (2–4). Conversation can now take place through the repeat coil bridge between the attendant and the central office.

When the attendant has received the information which enables her to key the extension number of the desired station, a pulsing circuit (not shown) is connected by the position circuit (FIG. 8) between the R1 and T1 leads of cable (2–4) to seize and then to reoperate in accordance with the attendant's keying the same incoming selector (FIG. 3) which was initially utilized to operate relay 2SW. The incoming selector when reseized by the pulsing circuit bridge causes a ground to be applied to the S lead of cable (2–3) which ground is continued over make contact 20A to the SC lead of cable (2–4) thereby allowing the position circuit to operate to inform the attendant that the selector has been reseized and is available to be reoperated in accordance with dial pulses transmitted by the attendant. Because of the removal of ground from leads CA and OL of cable (2–3) the selector may be directed to any level including the tenth level trunks without reoperating relay 2SW. When the inward switching train has been reoperated in accordance with the number transmitted by the attendant the attendant may, if she desires operate the RLS key at the attendant position circuit (FIG. 5) which results in the removal of ground from the TR lead of cable (2–4) causing relay 20A to release. Release of relay 20A causes relay 2TR to release, which disconnects the T and R leads of cable (2–3) from the attendant loop cable (2–4) and directly connects the 2BR to leads 201' and 202'. When the called station answers, the connector of the inward switching train returns battery on lead 202' and ground on lead 201' to maintain relay 2P operated even after the attendant has been disconnected from the circuit by the release of relay 2TR.

*Inward dialed call—Switchhook flashing to signal attendant*

While the operation of the incoming trunk circuit has just been described under the conditions when the calling party has dialed the directory number of the attendant, in many cases the calling party will directly dial the directory number of an extension station and be automatically connected thereto via the incoming selector 17 and inward switching train 19 of FIG. 1. Briefly this occurs as follows:

When the called extension station selected by the operation of the inward switching train answers in response to ringing applied by the connector (not shown) the answer supervision potential is applied by the connector across the T and R leads of cable (2–3). Relay 2P in the incoming trunk circuit operates from ground applied by the connector to lead 201', the central office bridge, back contacts 2SP and battery applied by the connector to lead 202' operating relay 2PA. Relay 2PA operated operates relays 2A and 2SP and completes an operating path to the winding of thermal relay 2T. Relay 2T operates after approximately one second. Relay 2T operated operates relay 2T1 which opens the operating path for relay 2T. When relay 2T releases after a suitable delay, a path is completed from ground over back contact 2T, front contact 2T1 and back contact 2W to operate relay 2W. Relay 2W operated releases relay 2T1. Relays 2W and 2SP remain locked up so long as the calling party and the extension user are in conversation, and the incoming trunk circuit is available to respond to switchhook signaling by the connected extension station should that station wish to obtain access to appropriate attendant.

If the need arises to transfer the call from the initially dialed extension station to any other extension station belonging to the called customer, the party at the first extension station momentarily depresses the switchhook at his telephone set. The on-hook condition causes the inward switching train connector (not shown) to apply on-hook T and R potentials to conductors 201' and 202' (battery on conductor 201' and ground on conductor 202') allowing relays 2P and 2PA to release.

When relay 2PA is released by the momentary on-hook condition of the called telephone, relay 2Z is operated over the path: ground, back contact 20A, make contact 2SP, make contact 2W, back contact 2PA, back contact 2Z, winding 2Z and battery. Relay 2PA released (with relay 2A holding on the central office 200 bridge) completes an operating path to the thermal relay 2T to start timing to distinguish between a switchhook flash and a disconnect. When the extension user releases the switchhook before relay 2T operates relays 2P and 2PA are reoperated and a locking path is provided for relay 2Z over its make contact, make contact 2SP and back contact 20A. Relay 2Z operated and relay 2PA reoperated shunt down the resistance battery for the winding of relay 2W causing relay 2W to release. Relay 2PA reoperated and 2Z operated connect audible tone from the ringing circuit to conductor 202. Relay 2Z operated applies 2108 resistance battery to the F lead of cable (2–4) and reoperates relay 2GT in similar fashion to that previously described in connection with a call originally dialed to the attendant. Relay 2Z operated prepares a path to operate relay 2TR to transfer the leads 201, 202 and 201', 202' to the attendant loop via cable (2–4).

When the conductors of cable (2–4) are connected to an available loop circuit, and the extension telephone in the off-hook condition thereby applying ground to lead 201' and battery to lead 202' the 5BL bridge diode SD (FIG. 5) is in the conducting direction thereby providing a hold bridge to the incoming selector circuit (FIG. 3) and the remainder of the switching train. At this point it should be noted that this condition is opposite to that obtaining when a call is initially dialed to the attendant for in the latter case the 5DL bridge diode SD is in the nonconducting direction removing the holding path for the selector.

If the extension user does not release the switchhook within a reasonable time after it was operated, i.e., if he desires to disconnect, relay 2T operates over the path provided by relay 2PA released thereby operating relay 2T1 which opens the operating path for relay 2T. When relay 2T releases it prepares the path including make contact 2T1 to shunt the resistance battery for relay 2SP. Relay 2W remains operated because (the extension remaining on-hook) relay 2PA was not reoperated to shunt resistance battery for relay 2W. Relays 2W and 2Z both being operated apply the ground prepared by relay 2T released and 2T1 operated to shunt the resistance battery for relay 2SP which releases. Relay 2SP released removes repeat coil bridge 2BR ground and battery from incoming trunk conductors 201 and 202 thereby providing a disconnect indication to central office 200.

*Called station disconnects*

When the called station places the receiver on-hook the connector (not shown) restores on-hook battery polarity to the T and R leads 201' and 202'. Relays 2P and 2PA release. Relay 2PA released completes an operating path to the winding of thermal relay 2T from ground, make contact 2A, back contact 2PA, back contact 2SK, back contact 2T1 to the winding of relay 2T. Relay 2T operates in approximately one second, and its make contact applies an operating ground to the winding of relay 2T1 which operates, locks to the ground provided over back contact 2PA and opens the operating path for relay 2T. Relay 2T releases in approximately two to three seconds and completes an operating path for relays 2W and 2Z from ground, back contact 2T, front contact 2T1, back contact 2W, winding 2W, diode 2DW, resistor 691 and battery, on the one hand, and ground, back contact 2T, front contact 2T1, back contact 2W, back contact 2PA, back contact 2Z, winding 2Z and battery, on the other hand. Relays 2W and 2Z operate, shunt the resistor 1000 battery to ground over make contact 2T causing relay 2SP to release. Relay 2SP releases, removing the off-hook potentials provided central office incoming trunk conductors 201 and 202 over the windings of relay 2A and permits conductors 201 and 202 to receive the on-hook potential applied to conductors 201' and 202' by the connector (not shown). Equipment at the central office responds to the on-hook potentials appearing on conductors 201 and 202 to free the trunk for another call.

*Calling party disconnects*

When the calling party disconnects, the bridge provided by the central office 200 to conductors 201 and 202 is removed causing relay 2A to release. Relay 2A released, opens the holding bridge provided by the winding of relay 2P across conductors 201' and 202' causing the incoming selector and inward switching train to release. Relays 2P, 2PA, 2SP and 2W release making the trunk circuit available to handle another call.

If the incoming trunk connects to the attendant loop and the calling party disconnects before the extension user, relay 2A is released and the bridge formed by the winding of relay 2P across the T and R leads of cable (2–4) is disconnected by the release of relay 2A. Relays 2P, 2PA and 2SP release, but the trunk is held busy by ground applied to the R lead and battery applied to the T lead of cable (2–4) by the windings of loop circuit relay 5L (FIG. 5). Ground on the R lead of cable (2–4) is applied over make contact 2TR, back contact 2SP, diode 2DP, relay 2P and back contact 2SP to the T conductor 201. Thus the attendant loop provides the same potential to conductors 201 and 202 as would be applied over the winding of relay 2A thereby maintaining trunk busy polarity to the central office so that the attendant may interrogate the extension user as to his need for further assistance without an intervening reseizure of the trunk by the central office. The attendant may release the busy condition by causing relay 2SK to release which in turn releases relay 2TR removing the loop circuit battery and ground from leads 202 and 201.

*Attendant disconnects*

When the attendant operates the trunk release key (FIG. 5) ground is removed from the T, R, and S leads of cable (2–4) causing relays 20A and 2SK, respectively, to release. Relays 20A and 2SK released cause relay 2TR to release. Relay 2TR released releases relay 2P which releases relay 2PA. If the calling station has not disconnected at this time ground is applied to the winding of relay 2T over make contact 2A, back contact 2SK and back contact 2T1. Relay 2T1 operated over the make contact of relay 2T causes relay 2T to release in approximately two to three seconds whereupon relays 2W and 2Z are reoperated shunting down resistance battery 1000 to winding 2SP causing relay 2SP to release. Relay 2SP released sends disconnect signals to central office which times out to release the trunk.

*Incoming selector circuits*

The typical incoming selector circuit of the multi-customer private branch exchange is shown in FIG. 3. This circuit is seized by placing a bridge between the ring and tip conductors 201', 202', to operate relay 3A. Relay 3A operated completes an operating ground from back contact 3D to operate slow-release relay 3B. Relay 3B operates relay 3F and also applies ground to the S lead of cable (2–3) to hold the preceding circuit. When the bridge between conductors 201' and 202' is interrupted at a pulsing rate, relay 3A releases during each interruption and operates the vertical magnet VERT over an operating path extending from ground, back contacts 3D and 3A, front contact 3B, the winding of relay 3C and of the vertical magnet to battery. Relay 3C is slow-release and remains operated during pulsing interruptions. The vertical magnet steps the wipers 3W to the level dictated by the number of interruption pulses applied between conductors 201' and 202'. Contacts VON are actuated on the first vertical step of wipers 3W (by means of mechanical linkage (not shown)) to operate relay 3E over the path: ground, back contact RL, front contact 3C and front contact VON. On the completion of vertical stepping, relay 3C releases, but relay 3E remains locked to ground applied over make contacts 3B and 3E, back contact ROT and front contact VON. Relay 3C released completes an operating ground to the rotary magnet over the path: ground, back contacts RL and 3C and make contacts 3E and 3F. The rotary magnet operates, steps wipers 3W to the first set of terminals in the multiple bank and opens the locking path for relay 3E which releases. Relay 3E released opens the operating path to the rotary magnet. If the sleeve terminal of the first set of terminals in the multiple bank is grounded (indicating that the associated trunk is busy), the ground applied to the 3W wipers associated with the sleeve terminal bank will reoperate relay 3E over the path from ground on the sleeve wiper, back contacts RL, 3RS11, and ROT and front contact VON. Reoperation of relay 3E recompletes the operating path to the rotary magnet which sets wipers 3W to the next set of terminals in the terminal bank as before.

When an idle sleeve terminal is reached, relay 3D operates over the path: ground, front contact 3D, winding 3B, back contacts RL, 3RS11, and ROT, front contact VON, the winding of relay 3E and battery. Relay 3E being marginal does not operate. Relay 3D operated, cuts through the R, T, S and F leads of cable (2–3) to wipers 3W and opens the operating path for relay 3A which releases. Relay 3A released opens the operating path to relay 3B which releases. Relay 3B released at its back contact prepares an operating path to release magnet RL. Relay 3B being slow-release remains operated for sufficient interval to assure that ground is maintained on the S lead of cable (2–3) until the bridge relay in the connector (not shown) of the inward switching train 19 (FIG. 1) operates to apply ground to the 3W wiper associated with the sleeve terminal bank.

If the dialed digit pulses the selector circuit to the attendant level the normal post (not shown) carrying wipers 3W will operate contact AL. Contact AL completes an operating path from ground applied over lead OL of cable (2–3) and make contact 3F to the winding of relay 3Z which operates. Relay 3Z operated grounds the O lead of cable (2–3) and also completes a path from grounded lead CA of cable (2–3), make contact 3B, back contact 3C, back contact NR, front contact 3Z to the 3W wiper associated with the sleeve terminal bank. Ground applied to the sleeve terminal bank wiper 3W causes relay 3E to be reoperated each time the rotary magnet releases during rotary hunting. The rotary magnet continues stepping and releasing until the shaft (not shown) carrying wipers 3W operates rotary switch 3RS11 thereby opening the operating path for relay 3E. Make contact 3RS11 applies flashing signal to the F lead of cable (2–3) from lead 120 of the ringing circuit.

When the attendant answers the call in response to the 120 IPM flashing applied to the F lead of her loop circuit, trunk circuit relay 2TR (FIG. 2) is operated and removes central office bridge from conductors 201' and 202' causing relay 3A to release. Relay 3A released completes the operating ground to the release magnet RL over the path: ground, back contact 3D, back contact 3A, back contact 3B, front contact VON to the winding of the release magnet. Release magnet RL locks to ground until contacts VON are restored to normal whereupon the operating path for release magnet RL is opened. When the attendant operates her keyset at the position circuit (FIG. 8), a bridge is connected across conductors 201' and 202' and relay 3A will be reoperated. Relay 3A reoperated permits dial pulses thereafter applied to conductors 201', 202' by the attendants' keyset to recontrol the vertical and horizontal stepping of the selector circuit.

If, instead of being directed to the attendant level, the wipers 3F were directed to a level upon which all trunks to the inward switching train were busy, the ground applied to the sleeve terminal wiper 3W would cause the selector to continue rotary hunting until rotary contacts 3RS11 were operated to apply superimposed busy tone from lead 60 of the ringing circuit conductor 202'. On the other hand, if the wipers 3W were directed by the central office pulsing to a restricted service level normal post contact NR would be operated at the restricted level to apply ground from lead CA of cable (2–3) to the 3W wiper associated with the sleeve terminal bank to continue rotary hunting until rotary switch 3RS11 were operated to return superimposed busy tone on lead 202′.

Relay 3D, after it has cut through the R, T, S and F leads of cable (2–3) to the R, T, S, and F lead of cable (13) to the inward switching train, locks to ground applied over the S lead. Relay 3D, when released by the removal of ground from the S lead, applies an operating ground over its back contact to the release magnet RL.

*Attendant trunk*

The attendant trunk circuit shown in the right-hand half of FIG. 3 is similar to the incoming trunk circuit of FIG. 2 in that it has a corresponding subgroup control relay 3GT circuit and trunk lead transfer relay 3TR circuit. An attendant trunk is activated by any of extension stations 20 dialing the number (usually zero) of the attendant. The outward switching train 20 (FIG. 1) controlled by the extension station seizes an idle attendant trunk by extending the calling station T and R bridge to operate relay 3L. Relay 3L operated connects audible ringing tone to the T lead capacitor, connects resistance battery to the F lead of cable (3–4) to activate the attendant loop circuit (FIG. 5), and operates relay 3L1. Relay 3L1 operated applies ground to the S lead of cable (31) to hold that portion outward switching train from the extension to the attendant trunk and completes the operating path for relay 3GT. Relay 3GT functions in relation to leads G—, GC and GT–B in similar fashion to that in which relay 2GT of FIG. 2 functioned in relation to leads G, GC and GT–A. Relay 3GT applies resistance battery to the S lead of cable (3–4) to indicate the graded multiple appearances of the attendant trunk appearance in the trunk finder switch banks (FIG. 4) in similar manner to that in which the S lead of cable (2–4) was marked by the operation of relay 2GT (FIG. 2). Relay 3SK is operated by the appearance of ground on the SC lead of cable (3–4) when the loop circuit is seized in response to the resistance battery applied to the F lead of cable (3–4). Relay 3SK operated removes resistance battery marking potential from the S lead of cable (3–4), connects the winding of relay 3TR to the TR lead of cable (3–4), releases relay 3GT and bridges the T and R lead of cable (3–4) to operate relay 5L in the selected loop circuit (FIG. 5). Relay 3SK locks to ground over the make contact of relay 3L1 instead of locking to the ground provided over the S lead by the selected loop circuit so that the calling extension, rather than the attendant, retains control of the connection.

When the attendant answers, the loop circuit (FIG. 5) removes ground from the SC lead of cable (3–4) and operates relay 3TR by applying ground to the TR lead of cable (3–4). Relay 3TR operated, cuts through the T and R leads of cable 31 from the calling extension to the attendant loop T and R leads of cable (3–4), cuts out the 3L relay, and prepares a path for the attendant loop T1, R1 leads of cable (3–4) to the T and R leads of cable (33) of the completing portion of the outward switching train. The completing portion of the outward switching train will be controlled in accordance with the pulses transmitted over the T1 and R1 leads of cable (3–4) by the loop circuit. Relay 3L1 is held operated after relay 3L is released and maintains ground on the S lead of cable (31). Relay 3TR operated also removes the short circuit from the T and R leads of cable (3–4) allowing the calling bridge to maintain the attendant loop seized. Relay 3TR operated also connects the S and F leads of cable (33) to the SC and F leads of cable (3–4) in similar fashion to that in which the S and F leads of cable (2–3) were connected to the SC and F leads of cable (2–4) by the operation of relay 20A.

The control by the attendant of the completion of a call and the release of the circuit are similar to that described above in connection with the incoming trunk.

*Trunk finder-position finder link*

The typical trunk finder-position finder link of the present invention is shown in FIG. 4. For the sake of simplicity the trunk finder circuit is shown in detail and only those connections of the position finder circuit are detailed which differ from the corresponding circuits of the trunk finder. FIG. 4 accordingly depicts one of a plurality of the A group trunk finder position finder pairs (i.e., one of the finder pairs on whose switch banks the graded multiple terminals of the A group trunks 16 (FIG. 1) appear in preferred locations), additional pairs of finders being associated with the illustrated pair as indicated in FIGS. 4, 6 and 7.

When an incoming call is directed to an attendant the call distribution circuit (FIG. 7) marks one of the leads A1–A0 of cable (4–7)T to indicate to the trunk finder circuits the trunk finder switch bank level of the trunk group in which the calling trunk appears. The call distribution circuit also marks one of the "A" leads of cable (4–7)P to indicate the level, on the position finder banks (not shown), of the loops belonging to the preferred attendant position. The call distribution circuit also applies a start ground to the one of the "D" leads, such as the D— lead shown by way of example, of the trunk finder position finder pair on whose switch banks the calling trunk group appears in a preferred position.

The start ground from the call distribution circuit applied to the D— lead of the preferred trunk finder operates the 4A relay in the trunk finder and the 4A′ relay in the position finder. Because the operation of both the trunk finder position finder circuits is essentially similar only the operation of the trunk finder will be described in detail: relay 4A operated applies ground to the PF lead of cable (4–6) and completes a ground operating path to the lower winding of relay 4C. Relay 4C operates and completes an operating path to the winding of the vertical magnet from ground, make contact 4A, make contact 4C, back contact 4E, the winding of vertical magnet, back contact 4D and battery. The vertical magnet operates, steps the shaft (not shown) carrying the wipers 4W one vertical step and opens the operating path to the lower winding of stepping relay 4C, which relay releases. Off-normal springs 4VON are operated when the shaft (not shown) carrying the 4W wipers is stepped to the first vertical position. Release of stepping relay 4C opens the operating path for the vertical magnet which releases, thereby restoring the operating path to the lower winding of the stepping relay 4C which reoperates restoring the operating path to the vertical magnet winding. Relay 4C and the vertical magnet continue stepping and releasing until the brush 4B, carried by the same shaft (not shown) which carries wipers 4W, contacts the commutator segment connected to the A— lead of cable (4–7)T grounded by the call distribution circuit. When brush 4B reaches the grounded commutator segment, relay 4E operates over the path from ground on the 4B brush, lower winding 4E, back contact of the rotary magnet, lower winding of relay 4C, back contact 4D and battery. Relay 4C is maintained operated in series with relay 4E preventing further stepping of the vertical magnet. Relay 4E operated locks at its upper winding in series with the winding of the vertical magnet under control of relay 4D released. Relay 4E operated transfers the ground of the 4A–4C stepping circuit from the winding of vertical magnet to the winding of the rotary magnet. The rotary magnet operates and rotates wipers 4W to the first set of terminals. The rotary magnet operated opens the operating path for relay 4C thereby releasing the rotary magnet. The rotary magnet released restores the operating path to the lower winding of relay 4C which reoperates restoring the operating path to the winding of the rotary magnet. The rotary magnet continues stepping until the 4W wiper associated with the sleeve terminals of the switch bank is brought into contact with the sleeve terminal having resistance battery applied thereto by the incoming trunk circuit. The resistance battery on the S lead operates relay 4F in series with the upper winding of relay 4C. Relay 4F operated locks to ground over its lower winding and the front contacts 4F, ROT, 4C and 4A. Relay 4F operated cuts through the R1, T1, R, T, SC, TR, and F leads of cable (2–4) to the associated position finder circuit. Relay 4F operated also completes an operating ground to the lower winding of relay 4D over make contacts 4VON and 4F. Relay 4D operated completes a path from the S lead of cable (2–4) and make contact 4F to the corresponding S lead circuit (not shown) of the associated position circuit. Relay 4D operated opens the operating path for slow release relay 4A. It is desirable that relay 4A be sufficiently slow in releasing so that a holding ground will be maintained on the S lead of cable (4–5) during the interval between the operation of the make contacts of relays 4F and 4D (which together provide sleeve lead continuity) and the seizure and operation of the attendant loop which returns holding ground to the S lead of cable (4–5). Relay 4D operated locks to the D— start lead via lead L to the associated position finder. Relay 4D operated open-circuits the bridge provided by its back contact between the E and N leads of cable (4–6) to indicate to the call distribution circuit that this finder is busy.

Relay 4A released and relay 4D operated connect in-starting lead L to out-start lead M. When the "A" relay of the associated position finder circuit, i.e., relay 4A′, has been released by the operation of position finder relay 4D′, the continuity of out-start lead M is extended over back contact 4A′ to lead C—. The C— lead of each position finder is connected to the "D" lead of the succeeding trunk finder circuit so that when the illustrated preferred trunk finder-position finder pair is busy a call may nevertheless be completed to an attendant loop by the next-preferred finder pair and so forth. When associated position finder 4D′ operates, an additional path is provided over make contact 4D′ and lead J in shunt with that provided by the busy trunk finder to transfer the ground from the D— over back contact 4A′ to the C— lead. Accordingly, as soon as the "D" relay of either the trunk finder or position finder is operated and the "A" relay of both the trunk finder and position finder have released the starting potential applied to the illustrated trunk finder-position finder pair is transferred to the next succeeding trunk finder-position finder pair. Relay 4D operated opens the operating paths and removes battery from the serially connected windings of relays 4C and 4E, short circuits the upper winding of relay 4C, and removes battery from the vertical relay. Relay 4C releases and relay 4E is released when the back contact of the vertical magnet reapplies ground to the primary winding of relay 4E.

When the SC lead from the attendant loop circuit cable (4–5) is cut through by the operation of the 4F relays of both the trunk finder and position finder to the SC lead of incoming trunk cable (2–4) the ground provided over that lead operates the trunk circuit 2SK relay which releases the call distribution circuit "6G" relay thereby removing ground from the D— start lead. Upon cut-through resistance battery is removed by the trunk circuit from the S lead of cable (2–4) and applied by the loop circuit to the S lead of cable (4–5).

When ground is removed from the S lead (either by the attendant loop or the called extension) relay 4F releases. Relay 4F released completes an operating path from ground, make contact 4VON, back contacts 4A and 4E and make contact 4VON to the release magnet. Relay 4D is held operated until the finder returns to normal and opens front contact 4VON. The secondary winding of relay 4D maintains relay 4D operated for the purpose of maintaining continuity between in-start lead L and out-start leads J and M during the interval between the energization of the release magnet and the cut-through of the subsequent finder pair which is started into operation by the grounding of the C— lead as described above.

*Call distribution circuit*

The call distribution circuit of the present invention is shown in FIGS. 6, 7, 9 and 10. In FIG. 6 there are shown the details of the PA gate, the "6G" relays of the marking and starting circuit and the input to the 6PF logic circuit, all of which were alluded to in the discussion of block diagram (FIG. 1). FIG. 7 shows the details of the marking and starting circuits controlled by the contacts of the "6G" relays for two customer sharing, and FIGS. 9 and 10 show the details of the marking and starting circuits controled by the "6G" relays for four customer sharing of the switching equipment.

In the foregoing discussion of block diagram (FIG. 1) it was assumed for the purpose of simplicity that all the Group A trunks 16 were assigned to one telephone customer and that the "Other" group trunks 16′ were assigned to at least one additional customer. It was also assumed that, together the incoming and attendant trunks aggregated one hundred in number, each group of ten trunks comprising a subgroup having an associated subgroup control relay (such as 2GT) and a subgroup "G" lead in cable (2–6). The trunks were divided into an A group 16, 32 and an "Other" group 16′, etc., the fifty trunks of each group being multiplied over the lower half of one group trunk finder banks and over the upper half of another group of finder banks, the groups of finders being termed, in the first case, the A group finders, and, in the second case, the B group finders. This permits the standardization of link circuits for groups of one hundred trunks. However, it is to be expected that even where two telephone customers' trunk requirements total one hundred, one customer may require more trunks, and consequently more attendants' loops than the other. FIGS. 6 and 7 accordingly illustrate the assignment of attendants' loops and trunk subgroup controls to a first customer having six subgroups of trunks and six attendant's positions and a second customer having four subgroups of trunks and four attendant's positions.

The "6PA" relays are operated when their associated attendant's position circuit is available. Battery for enabling the subgroup control relays of the subgroups of trunk circuits assigned to each customer is applied to the customer's "GT" lead via customer grouping jumpers *ja* or *jb*, respectively. For example, the make contacts of relays 6PA1 through 6PA6 will individually connect battery to the GT–A lead of cable (6–2) to apply operating battery to the subgroups of trunks (FIG. 2) assigned to their customer. Similarly, make contacts of relays 6PA7 through 6PA10 connect operating battery to the GT–B lead of cable (6–2) for the subgroups of trunks belonging to their particular telephone customer.

Ground is provided to the GC lead of the trunks over the back contact of relay 6GT, relay 6GT being normally released.

When the calling trunk has grounded its subgroup control "G" lead of cable (2–6), and a corresponding subgroup "6G" relay is operated, an operating path is completed for relay 6GA. Relay 6GA operated, operates relay 6GT which removes ground from the GC lead of cable (6–2), temporarily preventing subsequent calls from seizing the call distribution circuit until the operated "6G" relay is released. However, all calls arriving over trunks which ground their "G" lead of cable (2–6) at the same time will be permitted to operate the trunk subgroup control relays to seize the call distribution circuit.

The operation of one or more 6G and 6PA relays of FIG. 6 provides ground operating paths in FIG. 7 to the marking and starting leads of cables (4–7)T of the trunk finder and of cable (4–7)P of the position finder circuits.

For example, let it be assumed that a call arrives over an A group trunk such as the incoming trunk of FIG. 2. The G lead of cable (2–6) is grounded and operates relay 6G1. Relay 6PF is normally operated. Let it further be assumed that the trunk of FIG. 2 belongs to a group of trunks associated with the customer served by attendant's positions 1 through 6. If the attendant's position (FIG. 8) associated with relay 6PA1 is idle, lead PR1 will be grounded by the position circuit and relay 6PA1 will be operated. In FIG. 7 the operation of relays 6G1 and 6PA1 extends an operating ground to the A1 lead of cable (4–7)T and to the A1 lead of cable (4–7)P and grounds start lead D—. The grounding of lead A1 of cable (4–7)T applies ground to the A1 segment of the trunk circuit commutator FIG. 4, and the groundnig of the A1 lead of cable (4–7)P grounds the A1 commutator segment (not shown) of the position finder.

On the other hand, if the attendant's position associated with relay 6PA1 had been occupied when relay 6G1 was operated, relay 6P1 would be released and the ground applied by the 6G1 make contact of FIG. 7 would have been extended over the back contact of relay 6PA1 to make contact 6PA2. Assuming that the attendant's position associated with relay 6PA2 is idle, the ground is extended over make contact 6PA2 to the A2 lead of cable (4–7)P. If the positions associated with relays 6PA1 through 6PA5 are all busy, relays 6PA1 through 6PA5 are released and the ground is extended over their respective back contacts to the B group marking and starting circuits controlled by contacts 6G6 through 6C10. If the sixth attendant's position is idle the ground will be extended over make contact 6PA6 to the A6 lead of cable (4–7)P.

The operated 6G1 relay also extends ground appearing at back contact 6FBA to the D— start lead to start the trunk position finder pair of FIG. 4, the ground being applied to the D— lead over front contact 6PF. Relay 6PF is maintained normally operated so long as there is at least one idle trunk finder-position finder pair, as follows:

Each trunk finder-position finder pair, such as the pair shown in FIG. 4, bridges the E and N leads of cable (4–6) until that pair has succeeded in cutting through a connection between a trunk and an attendant loop, whereupon the bridge is removed. Accordingly, so long as at least one such bridge is maintained by the A group finders relays 6CHA and 6SA are maintained operated. Similarly for relays 6CHB and 6SB associated with the pairs of B group finders, with relays 6CHA, 6CHB, 6SA and 6SB operated relays 6FBA and 6FBB are released thereby maintaining relays 6CCA and 6CCB released and providing ground to relay 6BF over back contacts 6CCA and 6CCB. If all the finder pairs in the A group of finders are used in connecting A group trunks to attendant loops, relays 6CHA and 6SA are released and provide an operating path for relay 6FBA. Relay 6FBA operated removes ground from the A group "D" leads (FIG. 7). Relays 6FBA and 6GA operated operate relay 6CCA. Relay 6CCA operated opens the operating path for relay 6PF which releases. If none of the B group finders are busy relay 6PF is not provided with any alternative operating paths and so remains released until one or more of the 6G6 through 6G10 relays is operated. Relay 6PF released over its back contacts (FIG. 7) extends starting potentials to the B group finders and marking potentials to the graded multiple appearances of the A group trunks on the B group finder banks.

FIG. 7 shows that the B group finders have been arranged so that trunk subgroup 6 is assigned to the same telephone customer as trunk subgroups 1 through 5 and that trunk subgroups 7 through 10 have been assigned to another telephone customer. Accordingly, two different telephone customers "share" the B group finders.

Each time the call distribution circuit is seized by the operation of any of the 6G relays of FIG. 6A relay 6GA is operated over the path extending from ground and the operated one of the 6G make contacts to the winding of relay 6GA. The operation of relay 6GA completes an operating path from ground over the back contact 7Z (FIG. 7) to the winding of relay 7W which operates and locks. Relay 7W operated and relay 7Z released prepare preferred paths to the starting and marking leads of subgroups 1 through 6 and subordinate starting and marking paths to the leads of subgroups 7 through 10. For example, assume a call to have arrived over a trunk whose subgroup control operated relay 6G7, and operating ground will be prepared over back contacts 6G6 and 7Z to the 6G7 make contact for marking the A2 lead of the B group position finders and over back contact 6G6 and front contact 7W to start lead D2B. If relay 6G6 had been operated indicating that the customer assigned subgroups 1 through 6 required attendant assistance, the marking and starting paths to the customer assigned subgroups 7 through 10 would be interrupted. When relay 6G7 releases, no other "6G" relays having been operated simultaneously therewith, relay 6GA is released and operates relay 7Z thereby changing the customer preference, so that preferred marking and starting paths are made available to the customer assigned subgroups 7 through 10.

Relay 7Z operated transfers the locking path for relay 7W to the ground provided over the back contact of relay 6GA. When another call seizes the call distribution circuit by operating a 6G relay, relay 6GA is reoperated, relay 7W releases, relay 7Z remaining locked over the ground provided by make contact 6GA. Relay 7Z releases when relay 6GA is subsequently released, restoring the circuit to normal.

An alternative arrangement for marking and starting the trunk and position finders is shown in FIGS. 9 and 10 for the case where two customers are assigned to each of the A and to each of the G group finders. FIG. 9 shows the connections to be made to cables (4–6), (4–7)T, (4–7)P and lead D1 in lieu of those of FIG. 7. The first telephone customer is assigned to trunk subgroups 1, 2 and 3 and the second customer to trunk subgroups 4 and 5 of the A group finders. The third customer is assigned to subgroups 6, 7 and 8 and the fourth customer is assigned to subgroups 9 and 10 of the B group of finders. Accordingly, the transfer contacts for relays 6PA1, 6PA2 and 6PA3 (FIG. 9) arranged to provide subgroup level marked preferencing for the first telephone customer assigned to the A group of finders while the transfer contacts of relays 6PA4 and 6PA5 provided subgroup level marked preferencing for the position finders assigned to the second customer. The transfer contacts 6PA6 through 6PA8 and 6PA9 and 6PA10 (FIG. 10) provided similar subgroup level marked preferencing for the third and fourth telephone customers who are assigned preferred appearance on the banks of the B group position finders.

The state of the 7W and 7Z relays at their transfer contacts in FIGS. 9 and 10 determine which of the two customers assigned to the A group and which of the two customers assigned to the B group of finders have preferred marking and starting paths. For example, with relay 7Z released a marking ground is extended to make contacts 6G1 through 6G3 over back contact 7Z and to contacts 6G4 and 6G5 over the serially connected back contacts 6G1 through 6G3 and 7Z thereby establishing marking preference for the first customer of the A group finders. Relay 7W operated extends starting ground directly from back contact 6FBA to make contacts 6G1 through 6G3. However, starting ground is made available to contacts 6G4 and 6G5 only by way of serially connected back contacts 6G1 through 6G3 thereby establishing starting preference to the first customer of the A group of finders.

The function of contacts 7W and 7Z in FIG. 10 for the third and fourth telephone customers assigned to the B group finders may be understood by an analogy. The 6PF contacts of FIGS. 9 and 10 perform the function of subgroup level marked advance for the four customers assigned to the A and B group finders in FIGS. 9 and 10 as they did for the two telephone customers assigned to the A and B finders (FIG. 7). In addition to the relay contacts shown in FIG. 7, FIGS. 9 and 10 show a plurality of SH contacts for extending starting ground by way of make contacts 6GA to the "D" starting leads for the A and B group finders, the purpose being to simultaneously start all finders in the event of a calls-block condition. The winding of relay SH (not shown) is advantageously energized by any well-known timing circuit means operated by relay GA if relay GA remains operated for an inordinate length of time. Under these conditions, the timing circuit would open the operating paths for the G relays causing the G relays to release and to remove all marking and starting potentials initiated by attendant-seeking calls. One of the finders started into operation by relay SH would locate the source of the calling party and all other finders would release.

*Attendant loops and position circuit*

FIGS. 5 and 8, when placed in the relationship to each other indicated in FIG. 11, show the interconnection of the attendant loops with a typical attendant's position circuit. For the sake of simplicity, the details of an intermediate one of the several attendant loop circuits is shown together with the details of the first and last loops which differ from the intermediate loops. An attendant loop circuit is selected by the position finder circuit of FIG. 4 by hunting for S lead resistance battery 8BA on the level indicated to the finder by call distribution circuit (FIG. 7). The resistance battery 8BA potential is applied to the S lead of cable (4–5) over the path from resistance battery 8BA in the position circuit (FIG. 8) over lead BA and the "5L1" transfer contact chain circuit extending through the last intermediate and first attendant loop circuits. From the chain circuit the resistance battery appearing on the BA lead is applied over a normally operated 8AL contact to the S lead of cable (4–5).

The chain of 8AL and 5L1 contacts is provided in the BA lead linking the attendant loops associated with a position circuit for transferring resistance battery marking potential to a following attendant loop when a given attendant loop is seized for use on a call. The chain of 8AL and 5L1 contacts is provided in the RC lead linking the loop circuits associated with a position for the purpose of informing the position circuit when all of the loops associated with that position are in use. Thus, when a call is initially directed to a loop, the operation of relay 8CT opens the holding path for and causes the release of relay 8AL. Relay 8AL released shunts the 5L1 make contact in the RC lead thereby extending the ground on the lead RC from the preceding to the succeeding loop circuit. When the attendant operates the LOOP key the 5L1 make contact reinforces the 8AL back contact bridge. When all of the 8AL and 5L1 relays are in either of the aforementioned conditions ground is extended by lead RC from the first through the intermediate and the last loop circuits to operate relay 8VL in the position circuit. Relay 8VL operated grounds the AV leads to each of the loop circuits operating the loop circuits' 8AL relays over the respective back contacts 5H. Loop circuit relay 8AL operated removes the bridge across the make contact of relay 5L1 in the RC lead chain circuit. When a loop circuit is thereafter released by the attendant's releasing relay 5L1, the continuity of lead RC is interrupted, ground is removed from relay 8VL in the position circuit, relay 8VL releases, restores the ground to the PR1 lead thereby making the position available to receive another call, and removes ground from the AV leads.

When the trunk and position finders establish continuity between cables (2–4) and (4–5) relay 8CT operates from the resistance battery 2108 applied to the F lead of cable (2–4) by the trunk circuit (FIG. 2). Relay 8CT operated completes an operating path from the 60 IPM flashing terminal of the ringing circuit (FIG. 8) to the trunk lamp to inform the attendant that an incoming trunk call requires her assistance. The 8CT relay operated replaces the 8BA resistance battery on the S lead with ground over the path, ground, back contact 8DK, diode CD and make contact 8CT to hold the trunk finder and position finder. Relay 8CT operated applies ground to the SC lead of cable (4–5) to operate the 2SK relay of the trunk circuit and connects the 5BL inductor bridge (diode SD thereof being poled to release the incoming selector (FIG. 3)) between the T1 and R1 leads of cable (4–5).

Relay 8DK is marginal and does not operate in series with relay 8CT unless two finders had inadvertently arrived at the multiple terminals of the same attendant loop circuit causing two parallel resistance batteries to be applied to the F lead. In this event, the operation of relay 8CT would not be effective to place ground on the S and SC leads, and the S terminal appearances of the loop circuit on the finder would not be made busy nor would the 2SK relay of the trunk circuit be operated.

Relay 8CT operated opens the locking ground path for the normally operated loop circuit 8AL relay and relay 8AL releases. Relay 8AL released transfers the resistance battery from lead BA to the BA lead of the next attendant loop circuit associated with that attendant's position. Relay 8CT operated also completes an operating ground over its make contact and back contact 5L1 to the ALM lead of the position circuit to operate position circuit relay 8LM.

In response to the 60 IPM flashing trunk lamp the attendant depresses the loop key (FIG. 5) thereby operating relay 5AT over diode AD. Relay 5AT operated:

Locks to ground provided over the ATR leads chain circuits and opens at ATR chain to succeeding circuits.

When the loop circuit's 5AT relay is operated the ground extending from the position circuit ATR lead over the chained back contacts of each of the other loop circuit 5AT relays is opened (thereby releasing the position circuit 8PA relay) and the ground is transferred from the ATR lead over the make contact of the operated 5AT relay and the chained back contacts of each of the other loop circuit's 5AT relay to lock the 5AT relay to the selected loop.

Operates relay 5L1 over the path from ground, make contact 5AT, winding 51 to resistance battery.

Extends the T and R leads of cable (4–5) to the position circuit (FIG. 8) enabling the attendant to converse with the calling party via her headset associated with the position circuit.

Applies a ground to illuminate the LOOP lamps; and

Prepares operating paths to the RING TRK–RLS, SPLIT, Hold, Camp-on and RLS–FWD keys which may thereafter be operated by the attendant at the position circuit.

Relay 5L1 operated:

Grounds the TR lead of cable (4–5) to operate relay 20A of the trunk circuit,

Removes the ground formerly provided to the SC lead of cable (4–5) over the make contact of operated relay 8CT and prepares the SC lead for a new signaling function.

Opens the 60 IPM flashing circuit to the trunk lamp.

Transfers the resistance battery provided over the BA lead (for marking the S lead idle) to the next lower attendant loop circuit, and opens the ground path provided to lead ALM over the operated 8CT contact; and Transfers the winding of relay 8CT from the F lead circuit to resistance battery.

When the 20A and 2TR relays of the trunk circuit operate relay 2P is bridged across the T and R leads of cable (2–3) operating relay 5L. Relay 5L transfers the operating path in the trunk lamp from the 60 IPM flashing circuit to ground provided over make contact 5L1 and back contact 5RT to cause steady illumination of the trunk lamp.

Normally the 8AL relay of a loop circuit is released as soon as the trunk finder and position finder have cut through and before the attendant has answered the call (i.e., relay 8CT operated; relay 5AT normal). When all the loops have been assigned calls (all 8AL relays released) the chain of 8AL back contacts completes the RC lead operating path for relay 8VL of the position circuit. Relay 8VL operated applies ground over the back contact of each loop circuit 5H relay to reoperate the 8AL relay of each loop whose 5H relay is normal. The operated 8AL relays leave the chain to the 8VL relay dependent on the 5L1 relays. As soon as a 5L1 relay is released the RC lead continuity is broken, relay 8VL releases and allows another call to be routed to the now idle loop. The AV lead to each loop is routed over a back contact of the 5H relay of that loop so that its 8AL relay will not reoperate the released condition of that loop 5L1 relay to open the chain to the 8VL relay.

The attendant, by conversing with the calling party via her headset over the T and R leads entering the position circuit, receives information sufficient to enable her to determine the number of the extension to which the calling party desires to be connected. The attendant's head and key set may advantageously include a conventional dial or pushbutton keyset by means of which the digits of the desired extension may be directed to the switching stages. If a rotary dial is used the dialing bridge is directly connected between the T1 and R1 leads entering the head and key set. On the other hand, the attendants head and key set may advantageously utilize pushbutton keys. In this case it may be necessary to convert the signals produced by actuating such keys to pulses of the type needed to operate the step-by-step switches of the inward and outward switching train. A register sender link circuit 81 is connected tothe head and key set by cable RS for inserting pulse conversion apparatus between the keyset and the T1 and R1 leads. Register sender link 81 grounds lead CT to operate relay 8ST in the position circuit when the pulse conversion equipment is connected. Operation of relay 8ST in the position circuit operates relay 8SA in the loop circuit over the path, ground, back contact 8GT, make contact 8ST, leads CTF, make contact 5AT, diode DA and relay winding 8SA to battery. Relay 8SA operated transfers the T1 and R1 leads of cable (4–5) to the T1, R1 leads of the position circuit to complete the path for outpulsing. Relay 8SA operated also completes an operating path (previously prepared by the operation of relay 5L1) from the SC lead of cable (4–5) to the winding of relay 8SC. The bridge placed across the T1 and R1 leads either by the pulse conversion apparatus via the register sender link 81 or by a conventional rotary dial operates relay 3A of the first selector (FIG. 3). The selector returns a ground over the S lead of cable (2–3), make contact 20A of the trunk (FIG. 2) and the SC lead of cable (4–5) to operate relay 8SC. Relay 8SC operated completes a path to a signal lamp (not shown) notifying the attendant that the incoming selector is available to be operated by dial or keyset pulsing. The step-by-step pulses thereafter applied between the T1 and R1 leads operate the first selector and the remainder of the inward switching train in well-known manner. When register sender 81 completes outpulsing ground is removed from lead CT releasing relays 8ST and 8SA. When the inward switching train has been connected to the called extension, the connector (not shown) applies 30 IPM ground to the F lead of the switching train which ground is continued over make contact 8SC and back contact 5AS to the station lamp which winks at 30 IPM to inform the attendant that the called extension is ringing. If the extension is busy the connector will apply 60 IPM ground over the F lead and busy tone over the T1–R1 leads. When the called station answers, relay 5AS operates from battery applied to the T1 and ground applied to the R1 lead of cable (4–5) by the connector. Relay 5AS1 operated provides steady illuminating ground to the station lamp.

The attendant may now release the loop circuit from the connection by depressing the RLS key to operate relay 8AR of the position circuit over lead ATK. Relay 8AR operated at its back contact opens the ATR lead locking path for relay 5AT which releases. Release of relay 5AT removes illuminating ground from the loop lamp, disconnects the T and R leads from the position circuit, and releases relay 5L1. Relay 5L1 released releases relay 8CT, removes ground from the TR lead of cable (4–5) (causing the release of trunk relay 20A) and releases relay 8SC by disconnecting its winding from the ground provided over the SC lead of cable (4–5). Release of relay 8CT removes the 5BL inductor-5AS relay bridge across the T1 and R1 leads, removes ground from the S lead of cable (4–5) (thereby releasing the trunk and position finders as well as relay 2SK in the incoming trunk) and extinguishes the trunk lamp TRK. Relay 5AS released removes illuminating ground from the station lamp STA.

If the attendant desires to disconnect before the called extension answers, the RLS key is depressed and effects the release of relay 5AT as before. However, relay 5L1 remains locked up over back contacts 5AS and make contact 5L. When the called station answers relay 5AS operates releasing relay 5L1. Relay 5L1 released releases relays 20A, 8SC and 8CT as before. Relay 8CT released removes ground from the S lead of cable (4–5) and extinguishes the trunk lamp and causes the release of relay 5AS which removes illuminating ground from the station lamp.

In addition to calls which, arriving over an incoming trunk (FIG. 2), set the trunk and position finders (FIG. 4) into operation in response to the recognition by the incoming selector (FIG. 3) of the fact that the incoming trunk is attendant-seeking, calls may also be routed to an attendant by the attendant trunk circuit of FIG. 3 as well as by the incoming trunk recognizing that a party at a called extension station is flashing the switchhook. Under the latter conditions, in addition to the application of resistance battery by the respective trunk circuit to the F lead of cable (4–5) a bridge formed by the trunk circuit relay 2P or contacts 3TR and 3SR is connected between the T and R leads of cable (4–5) to operate loop circuit 5L. Relay 8CT is operated by resistance battery on the F lead. Relay 5L operated completes a path over its make contact and the operated make contact of relay 8CT to the trunk lamp TRK from the 120 IPM terminal of the ringing circuit. In addition, if the attendant is summoned by the extension user's switchhook signaling, relay 5AS is operated over battery applied to the T1 lead and ground applied to the R1 lead by the switching train connector (not shown). If the attendant is summoned by switchhook signaling relay 5AS is operated. When the attendant depresses the LOOP key, relay 5AT operates initiating the sequence of operation similar to that above described in connection with the attendant answering a call arriving over an incoming trunk except that the operation of relay 5L1 opens the TRK lamp 120 IPM flashing circuit instead of the 60 IPM circuit. When the extension user has given the attendant the desired information and replaces his receiver on the switchhook, the bridge across the T and R leads is opened and relay 5AS is released. The station lamp is extinguished by the release of relay 5AS. The attendant is now free to extend the call to another extension in the same manner as described above.

On the other hand, if the party signaling the attendant does not disconnect the attendant may operate the RLS FWD key to shunt resistance battery connected to the winding of relay 8CT thereby releasing relay 8CT. Relay 8CT released removes the 5BL inductor bridge releasing the selector train releasing relay 5AS and extinguishing the station lamp. When the RLS FWD key is released, relay 8CT reoperates and restores the 5BL bridge between the T1 and R1 leads. However, relay 5AS does not reoperate because diode SD is in the nonconducting direction for the battery applied to the R1 and ground applied to the T1 leads of cable (4–5) by the incoming selector. The attendant is now free to extend the incoming call to the new destination.

*Camp-on busy line*

If the attendant encounters a busy condition when extending an incoming call or in transferring a call from one extension to another, the call may be "camped" on the busy extension by depressing the Camp-on key to operate relay 5CB. Relay 5CB operated extends the 10 volt potential at the CP lead from the position circuit over make contacts 5AT and 5L1 to the SC lead of cable (4–5). The connector (not shown) of the inward switching train responds to the 10 volt potential on the SC lead to remove the busy tone applied over the T1, R1 leads but continues to maintain 60 IPM flashing to the station line over the F lead of cable (4–5). In the event that another call is camped on when the attendant operates the Camp-on key the connector will continue to apply busy tone over the T1 and R1 leads of cable (4–5) thereby indicating to the attendant that another call is already camped on the line and that the present call must be otherwise disposed of. When the connector is made available to connect the camped on call to the desired extension station it functions to change the 60 IPM to 30 IPM flashing over the F lead operating the station lamp to indicate to the attendant that the station is being rung. When the called station answers the circuit operates in similar fashion to that previously described above. Further details concerning the connector in Camp-on operation may advantageously be had by referring to the copending application of P. H. Arnold-V. J. Matthews, Serial No. 72,346 filed November 29, 1960.

*Recall of central office toll operator*

The ring key is provided so that the attendant may recall the central office operator. Depressing the ring key operates relay 5RB. Relay 5RB operated reverses the battery and ground potential applied to the T and R leads of cable (4–5) via the windings of relay 5L. Reversal of the battery and ground potentials releases the 2P, 2PA and 2SP relays in the incoming trunk (FIG. 2). The release of relay 2SP allows the battery and ground potentials determined by the operation of relay 5RB to be applied over conductors 201 and 202 to central office 200 indicating a disconnect condition to the central office. Releasing the ring key releases relay 5RB, restores the normal battery ground potential provided over the windings of relay 5L and permits the reoperation of relays 2P, 2PA and 2SP in the trunk. The central office now receives the polarity indicative of an answered line. The attendant may repeat this operation until the central office answers.

*Extension recall*

If a local station dials the attendant for a delayed outgoing call and requests to be notified when the call is ready he may hang up and the attendant may recall the on-hook extension (which reached the attendant via the attendant trunk (FIG. 3)) by depressing the Ring key. At this point it should be noted that the switching train from the extension to the attendant trunk is maintained connected after the extension user hangs up because ground is applied to the S lead of cable 31 (FIG. 3) by make contact 3LI, relay 3LI being held operated by relay 3TR which in turn was operated by the attendant in answering the call. The trunk finder-position finder (FIG. 4) is maintained connected between the attendant trunk and the loop after the extension user hangs up by ground or the S lead of cable (4–5) by the loop. Relay 5RB is operated when the Ring key is depressed. A relay 5L is in the released condition because the extension is in the on-hook condition, relay 5RC is operated over back contact 5L and make contact 5RB to apply ringing signal to the R lead of cable (4–5) and operate the bell at the extension. When relay 5L is operated by the off-hook signal received from the extension being rung the trunk lamp TRK is illuminated over the path extending from ground, back contact 5RT, front contact 5LI, front contact 5L and front contact 8CT.

*Hold call on loop*

The attendant may hold a call on a loop circuit by depressing the Hold key to operate relay 5H. Relay 5H operated furnishes an additional locking ground for relay 5LI and applies battery to the windings of relay 5RT and 5RS. Relay 5H operated places the bridge including the left hand winding of relay 5CB and diode DB across the T1 and R1 leads of cable (4–5) and completes a path from the 30 IPM terminal of the ringing circuit to the LOOP lamp. Relay 5LI operated maintains the ground on the S lead of cable (4–5) thereby holding the switching train. When the ringing is applied to the T1 and R1 leads by the central office relay 5CB operates and locks. Relay 5CB operated operates relay 5RS. The switching train will be held on the position loop until released by the attendant. If the call being held arrives over the incoming trunk the incoming train releases when the calling station disconnects. The hold condition is removed by operating the LOOP key which shunts the resistance battery from the winding of relay 5H causing it to release.

*Attendant recall by extension held on attendant trunk*

When the extension user whose call to the attendant has been held, depresses the switchhook to recall the attendant relay 5L releases in response to the on-hook signal and operates relay 5RT. When the switchhook is released relay 5L reoperates, applies ground to lead ALM to the position circuit and connects 120 IPM illuminating ground from the ringing circuit to the trunk lamp TRK. The attendant answers by operating the LOOP key which in turn operates relay 5AT. Relay 5AT operated releases relay 5RT which removes ground from the ALM lead, and replaces 120 IPM ground to the trunk lamp TRK with steady illuminating ground. Operation of the LOOP key shunts resistance battery from relay 5H winding and relay 5H releases. Relay 5H released removes the 30 IPM ground from the LOOP key and substitutes steady illuminating ground thereto.

*Attendant recall by extension held on incoming trunk*

When the called extension depresses the switchhook relay 5AS of the 5BL bridge is released. Relay 5AS released and relays 5H and 8AL operated operate relay 5RS. Relay 5RS operates and locks to ground over the back contact 5AT. When the switchhook is released relay 5AS reoperates. Relay 5RS operated and relay 5AS reoperated reconnect ground to the ALM lead of the position circuit and reconnect 120 IPM illuminating ground from the ringing circuit to the station lamp STA. The attendant answers by operating the LOOP key which operates relay 5AT to release relay 5RS. Relay 5RS released removes ground from the ALM lead and replaces the 120 IPM illuminating ground to the station lamp with a steady ground. Relay 5AT operated shunts the winding of relay 5H which releases replacing the 30 IPM illuminating ground to the LOOP lamp with steady ground.

*Announcement of incoming call*

When it is desired to make an announcement of the identity of the calling party, the attendant operates the SPLIT key to operate relay 5SP which operated locks to ground over the 5AT make contact and opens the talking path between the T and R leads and the T1 and R1 leads of cable (4–5). The SPLIT lamp is supplied with a steady illuminating ground over make contacts 5L and 5SP. The attendant may now operate the dial or key set advantageously provided at the position circuit for applying step-by-step pulses to the T1 and R1 terminals of cable (4–5) to call the desired extension and announce the call to the extension user. If the extension user indicates to the attendant that the call is to be accepted the attendant depresses the LOOP key which operates relay 5AT and provides a ground over make contact 5AT and diode TKD to shunt resistance battery from the winding 5SP which relay releases. Conversation may now take place between the calling party and the desired extension over back contacts 5SP. The attendant may now depress the RLS key to operate relay 8AR in the position circuit which removes the locking ground from relay 5AT and relay 5AT releases restoring the loop to normal.

Accordingly, it is seen that service of a private branch exchange nature is provided to a number of telephone switching train branches, which branches may be assigned on a flexible basis to different telephone customers. The switching apparatus for all the switching branches and different telephone customers is advantageously centrally located whereby all the telephone customer tenants in a large office building or other locality of high density PBX utilization may be served without resorting to the use of individually customized installations on the individual premises of the several customers. Each telephone customer being supplied with PBX service need only engage a suitable number of telephone attendants in lieu of switchboard operators each of which attendants need only be supplied with the head and key set and the keys and lamps of the position and loop circuits of FIGS. 5 and 8, the remaining elements of these circuits as well as the equipments of FIGS. 2, 3, 4, 6 and 7 (or 9 and 10 in lieu of 7) being centrally located in a nonpremium space such as a basement. The attendant equipment is further simplified because none of the many trunks and extension switches associated with the customers switching branches need have permanent equipment appearances before the attendants.

It is to be understood that the above-described arrangements are illustrative of the application of the principles of the invention; numerous other arrangements may be devised by those skilled in the art without departing from the spirit and scope of the invention.

What is claimed is:

1. A branch exchange telephone system having a link circuit for selectively connecting a plurality of customers' attendants' position loops between incoming trunks and the corresponding inward switching trains of said exchange assignable to the different ones of said customers, said link comprising: first finder switches associated with said trunks and second finder switches associated with said loops, distribution means for marking first switch bank appearances of said trunks and said loops on the respective banks of said finder switches, gating means including a customer assignment cross-connection field for gating said distribution means to mark said switch bank appearances, and position loop supervisory means coupled to said distribution means for marking alternate switch bank appearances of said position loops.

2. A branch exchange telephone system according to claim 1 wherein said link comprises counting means coupled to said trunks and selectively responsive to the seizure of any of said switch trains assigned to said different ones of said telephone customers, and means controlled by said counting means for modifying said gating of said distribution means.

3. A branch exchange telephone system according to claim 2 wherein said distribution means comprises link supervisory means responsive to the state of said finder switches for altering said marking of said trunk and loop appearances.

4. A branch exchange telephone system according to claim 1 wherein said gating means includes means for gating said distribution means to mark said switch bank appearances in a preferred sequence of customer assignments, and means responsive to the operation of said finder switches for changing said preferred sequence.

5. In a telephone system for providing private branch exchange service to a number of different telephone customers and including a plurality of inward switching trains and customers' PBX attendant position circuits, said inward switching trains being individually associated with said different telephone customers for connecting each of said customers' incoming trunks with his extension stations, the combination comprising: trunk means for applying a restricted service condition to at least one switching level of said inward switching trains, means for operating said switching trains responsive to a calling condition of said incoming trunks, means responsive to the operation of said switching train in said restricted service condition for connecting one of said PBX attendant position circuits to said incoming trunk, means controlled by the connected one of said trunk circuits for removing said restricted service condition, and means for reoperating said switching train to levels including said one level during the continuance of said calling condition.

6. In a multicustomer telephone exchange having a plurality of private switching branches and a link for selectively connecting customers' trunks with attendants' loop circuits incident to the initiation of switching by said switching branches said link comprising a plurality of pairs of finder switches having distributed over their respective bank multiples the trunks and attendant loop circuits of the several telephone customers, a plurality of distribution terminals associated with said bank multiples, a plurality of transfer contacts individually associated with said distribution terminals, a plurality of chain paths linking said plurality of transfer contacts on a flexible basis, the number of said paths corresponding to the number of said several telephone customers, and the number of said transfer contacts linked by each of said paths corresponding individually to the number of said several customers' loop circuits, means controlled by said trunks for preparing operating paths to predetermined ones of said distribution terminals, and means controlled by said attendant loops for operating said transfer contacts selectively to extend said operating paths to others of said distribution terminals.

7. In a multicustomer telephone exchange having both a link for connecting together the trunks and attendants' loops assignable to each of the several customers and a plurality of switching branches for connecting together the trunks and the extension stations assignable to said several customers, said link comprising a first and at least a second plurality of finder switches, a first group of said trunks and said loops having preferred graded multiple appearances on said first and auxiliary graded multiple appearances on said second plurality of finder switches and a second group of said trunks and said loops having preferred graded multiple appearances on said second and auxiliary graded multiple appearances on said first plurality of finder switches, distribution means controlled by said trunks and said loops in response to the operation of said switching branches for marking said preferred graded multiple appearances, and logic means responsive to a predetermined operation of said first and said second group of trunks for marking said auxiliary graded multiple appearances.

8. A private branch exchange having a plurality of switching branches for effecting connections between sources and destinations and comprising a cordless-attendant, switching-branch control apparatus including a plurality of loop paths and means for displaying the state of a source and a destination connected at respective ends of any of said loop paths; a link for selecting and connecting said loop paths in said switching branches; each of said paths having first and second path means extendable through said link; said first path means being initially responsive to a switching branch potential for holding said link and subsequently responsive to switching branch potentials extended through said link being held for indicating the state of said switching branch source and destination to said display means; said second path means including a switching branch source supervisory circuit and a switching branch destination supervisory circuit, said switching branch source supervisory circuit normally being connected to indicate a connect condition to said switching train source and said switching branch destination supervisory circuit being connected to indicate a disconnect condition toward said switching branch destination.

9. A private branch switching system comprising a switching train including a first stage having a pair of input terminals and being responsive to directing signals applied at said input terminals to extend a connection from a source to a destination, an input supervisory device normally connected at said terminals of said first stage to indicate a destination on-hook condition to said source, control path means for disconnecting said supervisory device, means responsive to the connection to a destination by said switching train for activating said control path means, a link, a loop including a first section and a second section coupled to said first section, said control path means being extendable by said link to said second section, said first section being connectable through said link to indicate a destination off-hook condition to said source and said second section being connectable through said link to operate said supervisory device.

10. A multicustomer private branch exchange having a link circuit for matching calling trunks to appropriate telephone customers' attendant circuits, said link circuit comprising a plurality of finder switches, means for marking on said finder switches graded multiple appearances of said calling trunks, means for marking on said finder switches corresponding appearances of said attendant circuits, means for advancing said marking when said preferred attendant circuits are busy, and means for restricting said marking advancing individually to the attendant circuit appearances of each telephone customer.

11. A multicustomer private branch exchange according to claim 10 wherein said plurality of finder switches are arranged in pairs and wherein said means for advancing said marking includes transfer contact means associated with one finder of each of said pairs.

12. A multicustomer private branch exchange according to claim 11 wherein said means for restricting said marking advancing includes at least one chain path linking predetermined ones of said transfer contacts.

13. A multicustomer private branch exchange comprising a plurality of switching branches, a plurality of customers' attendants' loop circuits, link circuit means for connecting said loop circuits in predetermined ones of said switching branches, at least one attendant position having first intermediate and last ones of said plurality of loop circuits associated therewith, said attendant position including means interconnecting said first intermediate and last loop circuits and controlled by said link circuit for seizing said loops in predetermined sequences, and said attendant position including means jointly responsive to the operation of said control keys and said connecting means for controlling said link circuit.

14. A multicustomer branch exchange according to claim 13 wherein said means for controlling said link circuit includes said plurality of control keys.

15. A multicustomer private branch exchange according to claim 14 wherein said means for controlling said link includes means for determining the number of said loop circuits seized by said link.

16. A private branch exchange comprising an inward switching train, a plurality of trunks incoming to said exchange, a plurality of extension stations belonging to different telephone customers served by said branch exchange, at least one attendant loop circuit for each of said different customers, means controlled by said incoming trunks and said inward switching train for assigning calls arriving over said incoming trunks to said different customers' loop circuits, said last-mentioned means including a plurality of normally-preferred link circuits for assigning said calls from first ones of said trunks to first particular ones of said customers' loop circuits and for assigning second ones of said trunks to second particular ones of said loop circuits, gating means individually controlled by the busy ones of said loop circuits for connecting said trunks to other particular ones of said customers' loop circuits and means collectively controlled by said busy ones of said loop circuits for changing the preferred ones of said plurality of link circuits.

17. In an inward switching private branch exchange according to claim 16 the combination wherein said gating means includes means for detecting when all said link circuits normally preferred to serve said first particular ones of said customers are busy and when none of the link circuits normally preferred to serve said other particular ones of said customers are busy.

18. In an inward switching PBX according to claim 17 the combination further comprising means controlled by said detecting means for operating link circuits having said first trunks appearing thereon in second preferred positions to connect said first trunks to said first particular ones of said customers' loop circuits.

References Cited by the Examiner

UNITED STATES PATENTS

| | | | |
|---|---|---|---|
| 2,289,896 | 7/42 | Bakker | 179—18 |
| 3,037,084 | 5/62 | Horwitz et al. | 179—18 |

ROBERT H. ROSE, *Primary Examiner.*

WILLIAM C. COOPER, *Examiner.*